(12) United States Patent
Wilhelmsson et al.

(10) Patent No.: US 10,187,233 B2
(45) Date of Patent: Jan. 22, 2019

(54) MULTI-MODULATION RECEIVER, TRANSMITTERS AND METHODS FOR HANDLING MULTI-MODULATION IN WIRELESS COMMUNICATION SYSTEMS

(71) Applicant: Telefonaktiebolaget LM Ericsson (publ), Stockholm (SE)

(72) Inventors: Leif Wilhelmsson, Dalby (SE); Miguel Lopez, Solna (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 264 days.

(21) Appl. No.: 15/031,527

(22) PCT Filed: Mar. 31, 2016

(86) PCT No.: PCT/EP2016/057102
§ 371 (c)(1),
(2) Date: Apr. 22, 2016

(87) PCT Pub. No.: WO2017/167380
PCT Pub. Date: Oct. 5, 2017

(65) Prior Publication Data
US 2018/0091337 A1 Mar. 29, 2018

(51) Int. Cl.
*H04L 27/00* (2006.01)
*H04L 27/14* (2006.01)
(Continued)

(52) U.S. Cl.
CPC .......... *H04L 27/0008* (2013.01); *H04L 27/14* (2013.01); *H04L 27/265* (2013.01);
(Continued)

(58) Field of Classification Search
CPC .............. H04L 1/0003; H04L 27/2634; H04L 27/2628; H04L 5/0091; H04L 5/0048;
(Continued)

(56) References Cited

U.S. PATENT DOCUMENTS 9,525,540 B1 12/2016 Shellhammer et al.
9,729,268 B2 8/2017 Kenny et al.
(Continued)

FOREIGN PATENT DOCUMENTS

WO 2008130102 A1 10/2008

OTHER PUBLICATIONS

International Search Report and Written Opinion dated Dec. 5, 2016 for International Application Serial No. PCT/EP2016/057102, International Filing Date—Mar. 31, 2016 consisting of 15-pages.
(Continued)

*Primary Examiner* — Rahel Guarino
(74) *Attorney, Agent, or Firm* — Christopher & Weisberg, P.A.

(57) ABSTRACT

A multi-modulation receiver configured to receive a multi-carrier signal comprising data transmitted from multiple transmitters. At least one of the transmitters is a transmitter using a modulation scheme other than Orthogonal Frequency-Division Multiplexing. Data transmitted from different transmitters are mapped to different subcarriers in the frequency domain. The multi-modulation receiver has a radio unit configured to receive the multicarrier signal. A cyclic prefix unit is configured to remove a Cyclic Prefix from the received multicarrier signal. A Fast Fourier Transform unit is configured to separate data received from the individual transmitters into mutually orthogonal subcarriers by transforming the multicarrier signal in the time domain to multiple orthogonal subcarrier signals in the frequency domain. A demapping unit is configured to, for each of the multiple transmitters, demap the corresponding subcarrier signals in accordance with the modulation scheme of the respective transmitter.

21 Claims, 11 Drawing Sheets

(51) Int. Cl.
H04L 27/26 (2006.01)
H04W 4/70 (2018.01)
H04W 84/12 (2009.01)

(52) U.S. Cl.
CPC .......... *H04L 27/2601* (2013.01); *H04W 4/70* (2018.02); *H04W 84/12* (2013.01)

(58) Field of Classification Search
CPC ............ H04L 27/0008; H04L 27/2636; H04L 27/2627; H04L 1/0606; H04L 1/0668; H04L 25/03159; H04L 2025/03426; H04L 27/18; H04L 5/0094; H04L 27/10; H04W 72/02; H04W 72/042; H04W 4/70; H04W 52/0206; H04W 74/006; H04W 72/1215; H04W 88/10; H04B 7/04; H04B 7/0669; H04B 7/0452
See application file for complete search history.

(56) References Cited

U.S. PATENT DOCUMENTS

| | | | |
|---|---|---|---|
| 2005/0063345 A1 | 3/2005 | Wu et al. | |
| 2006/0039273 A1* | 2/2006 | Gore | H04L 5/0044 370/208 |
| 2006/0193375 A1 | 8/2006 | Lee | |
| 2006/0203935 A1 | 9/2006 | Li et al. | |
| 2007/0202816 A1* | 8/2007 | Zheng | H04L 5/0037 455/91 |
| 2007/0211619 A1 | 9/2007 | Jalloul et al. | |
| 2008/0031376 A1* | 2/2008 | Ban | H04L 27/2602 375/271 |
| 2008/0200124 A1 | 8/2008 | Capretta et al. | |
| 2008/0279089 A1 | 11/2008 | Rosenhouse et al. | |
| 2009/0109835 A1 | 4/2009 | Green | |
| 2010/0046463 A1 | 2/2010 | Green | |
| 2012/0147814 A1* | 6/2012 | Valbonesi | H04L 27/0008 370/328 |
| 2014/0016653 A1 | 1/2014 | Oh et al. | |
| 2014/0177756 A1* | 6/2014 | Park | H04L 27/3405 375/298 |
| 2014/0211872 A1 | 7/2014 | Hassan et al. | |
| 2016/0119184 A1* | 4/2016 | Soriaga | H04W 8/005 370/254 |
| 2017/0181167 A1* | 6/2017 | Kenney | H04L 27/2636 |

OTHER PUBLICATIONS

Robert Stacey, Intel, IEEE 802.11-15/0132r8 Wireless LANs "Specification Framework for TGax" Dated Sep. 22, 2015 consisting of 22-pages.
U.S. Notice of Allowance dated Mar. 30, 2018 for U.S. Appl. No. 15/032,203, filed Apr. 26, 2016, consisting of 10-pages.

* cited by examiner

MULTI-MODULATION RECEIVER, TRANSMITTERS AND METHODS FOR HANDLING MULTI-MODULATION IN WIRELESS COMMUNICATION SYSTEMS

TECHNICAL FIELD

The disclosure relates to methods, devices, and computer programs in wireless communications. More specifically, the disclosure relates to concurrent transmission of signals using different modulation schemes and to a corresponding multi-modulation receiver.

BACKGROUND

Internet of Things, IoT, is expected to increase the number of connected wireless devices significantly. A number of devices, e.g. household appliances such as microwave ovens, operate at frequencies about 2.4 GHz. The electromagnetic emissions from these devices risk producing interference with wireless communication devices operating near the same frequency. To avoid interference from devices not intended for wireless communication certain frequency bands have been reserved for wireless communication purposes via international agreements. The use of the reserved frequency bands are regulated using licenses, which is why these bands are often called licensed bands. Analogously, bands not reserved and hence not regulated using licenses are called unlicensed bands. The 2.4 GHz band which is mainly intended to be used for industrial, scientific and medical applications, ISM, is an example of an unlicensed band.

A vast majority of the IoT-devices will likely operate in unlicensed bands, in particular the 2.4 GHz ISM band. At the same time, there is also increased demand for using the unlicensed bands for services that traditionally have been supported in licensed bands. As an example of the latter, 3GPP, that traditionally develop specifications only for licensed bands has now also developed versions of Long Term Evolution, LTE, which will operate in the 5 GHz unlicensed band.

Technologies that are expected to dominate for IoT services are Bluetooth Wireless Technology, in particular Bluetooth Low Energy, BLE, and future versions of IEEE 802.11 like 802.11ax. With respect to IEEE 802.11, there are currently efforts to standardize an integrated long range low power, LRLP, mode which at least to some extent builds upon the above mentioned 802.11ax.

IoT applications are foreseen to most often have rather different requirement and features compared to applications like e.g. file down-load and video streaming. Specifically, IoT applications would typically only require low data rate and the amount of data transmitted in a single packet may many times only be a few bytes. In addition, the transmissions to and from many devices will be very seldom, e.g. once an hour or even less often. However, the number of IoT devices is expected to be huge, which means that although the amount of data to each one of the devices may be small, the aggregated IoT data may still be substantial. Many use cases for IoT applications can be found in an ordinary home, and may be related to various sensors, actuators, etc. The requirements for coverage are therefore substantially less demanding than what usually can be achieved by e.g. a cellular system. On the other hand, the coverage which can be obtained by e.g. Bluetooth or 802.11b/g/n/ac may not suffice. This may be in particular true if one of the devices is outdoors whereas the other device is indoors so that an exterior wall with rather high penetration loss is in between the devices. Due to this shortcoming of current versions of Bluetooth Wireless Technology and IEEE 802.11, both these standardization organizations are working on new versions that would significantly increase the coverage.

The straightforward approach to increase the range of a communication link is to reduce the bit rate that is used. Reducing the bit rate by necessity means that it will take longer to transmit a packet of a certain size. As a side effect of this, the channel will be occupied for a longer time. Now, with a large number of devices sharing the same channel, the channel may be congested if this sharing is not done in an effective way. The need for long packets and the increased number of users will make this congestion even more pronounced.

Moreover, the amount of non-IoT data, e.g. data download and video streaming, transmitted over the same channel may also increase. This implies that to obtain good performance for both IoT applications and non-IoT applications, some coordination should preferably take place. Today there is no single standard that effectively supports both high-data rate application and really low cost IoT applications, like sensors. The main standard for the former is IEEE 802.11, e.g. 802.11n and 802.11ac, whereas the main standard for the latter is Bluetooth Low Energy. Hence, typically two systems need to operate in parallel and preferably in a synchronized fashion.

An obvious, and probably the simplest, way to do such coordination is by time sharing between the systems. For example, each system is assigned time slots where data may be transmitted or received according to a predetermined scheme. This is commonly referred to as Time Division Multiplexing, TDM. In each time slot assigned to a specific system, this system may then for instance use Time Division Duplex, TDD, which is a common way of implementing time sharing, wherein users are assigned time slots for uplink and downlink transmission. The main reason for TDD is that it allows for low cost implementation without the need for costly duplex filters, which are needed in case frequency division duplex, FDD, is employed. However, as the data rate for the IoT system is very low for the individual links, it may likely be hard to obtain good spectrum efficiency in this way.

Instead it would be preferable if the two systems, i.e., both the IoT system and the non-IoT system could operate concurrently. One means to achieve this could be if the non-IoT system would be based on orthogonal frequency division multiplexing, OFDM. Concurrent operation could then be achieved by assigning one or more subcarriers to the IoT system and the remaining ones to the non-IoT system. The amount of subcarriers allocated to the IoT system could in this way be rather flexible.

The approach of using OFDM is conceptually simple and is also the approach suggested for the Long Range Low Power mode currently discussed within IEEE 802.11. Although this clearly is an attractive property, it does not address the even more important question namely how to build extremely low cost and low power devices.

Hence, there is a need for network nodes that support concurrent operation with different types of wireless devices, one type able to transmit and receive high data rates such as OFDM, the other only able to transmit and receive considerably lower data rates.

SUMMARY

An object of the present disclosure is to provide methods and devices configured to execute methods and computer programs which seek to mitigate, alleviate, or eliminate one or more of the above-identified deficiencies in the art and disadvantages singly or in any combination. This object is achieved by a multi-modulation receiver configured to receive a multicarrier signal comprising data transmitted from multiple transmitters; wherein at least one of the transmitters is a transmitter using a modulation scheme other than Orthogonal Frequency-Division Multiplexing, OFDM, and wherein data transmitted from different transmitters are mapped to different subcarriers in the frequency domain. The multi-modulation receiver comprises a radio unit configured to receive the multicarrier signal. The multi-modulation receiver further comprises a cyclic prefix unit configured to remove a Cyclic Prefix, CP, from the received multicarrier signal. The multi-modulation receiver also comprises a Fast Fourier Transform, FFT, unit configured to separate data received from the individual transmitters into mutually orthogonal subcarriers by transforming the multicarrier signal in the time domain to multiple orthogonal subcarrier signals in the frequency domain. The multi-modulation receiver additionally comprises a demapping unit configured to, for each of the multiple transmitters; demap the corresponding subcarrier signals in accordance with the modulation scheme of the respective transmitter. The proposed receiver enables a network node which supports concurrent reception from different types of wireless devices using different modulation schemes, e.g. one able to transmit and receive high data rates, the other only able to transmit and receive considerably lower data rates. In doing so, it is ensured that both kinds of transmissions can be received in a cost effective and power efficient way at the same time as the transmitter is optimized for the respective purposed of the two different standards. The present disclosure presents an effective means to demodulate both signals using only one FFT.

According to some aspects, at least one of the multiple transmitters is an OFDM transmitter. OFDM is a natural choice when high data rate is to be supported as it allows for relatively low complex reception, which in turn depends on that the channel equalization is straightforward.

According to some aspects, the transmitter using a modulation scheme other than OFDM has a lower data rate than the OFDM transmitter. The transmitter implementing a modulation scheme having a lower data rate, is e.g. a sensor device adapted to transmit a Long Range Low Power, LRLP, signal, i.e. a "Bluetooth Low Energy, BLE, like" signal, which unlike a standard BLE signal has features that allow for efficient reception at a multi-modulation receiver.

According to some aspects, the OFDM receiver operates in accordance with IEEE 802.11 or 802.11ax. Specifically, both the 802.11ax signal and the LRLP signal are separated by using an FFT. In addition to the reduced complexity, it will, as mentioned above, ensure sufficient orthogonality between the 802.11ax signal and the LRLP signal. This enables full reuse of existing 802.11ax hardware in a network node as well as low cost low power devices, e.g. Internet of Things, IoT, applications.

According to some aspects, the transmitter using a modulation scheme other than OFDM is a single carrier transmitter. Single carrier transmission may be preferable for low data rates, which only require a narrowband channel. In particular, single carrier modulation which has a constant envelope has some desirable features from a transmission point of view due to less strict requirements on transmitter linearity. The relaxed requirements are typically used to drive a power amplifier, PA, in the non-linear region, which in turns allow for significantly higher efficiency. By being able to receive single carrier signals, the multi-modulation receiver implements a Long Range Low Power aspect. For instance, Bluetooth Low Energy is based on single carrier signals using Gaussian Frequency-Shift Keying.

According to some aspects, the transmitter using a modulation scheme other than OFDM is a Frequency-Shift Keying, FSK, transmitter. Frequency-Shift Keying, in particular Gaussian Frequency-Shift Keying, is e.g. used by Bluetooth, and in particular Bluetooth Low Energy.

According to some aspects, the demapping unit, for the non-OFDM signal, is configured to demap the data such that the demapping is performed based on output amplitudes after the transformation to the frequency domain. By performing the demapping based on output amplitudes it is possible to discriminate between two states represented by amplitudes at different frequencies. This facilitates implementations for reception of Binary Frequency-Shift Keying, BFSK. The ease by which the largest amplitude can be identified reduces the need for a high number of FFT points.

According to some aspects, the disclosure also relates to a network node in a wireless communication network comprising a multi-modulation receiver according to the present disclosure. The network node comprises a multi-modulation receiver and consequently has the same advantages as the multi-modulation receiver.

According to some aspects, the disclosure also relates to a non-OFDM transmitter using a modulation scheme other than Orthogonal Frequency-Division Multiplexing, OFDM, for transmitting data to a multi-modulation receiver, wherein the multi-modulation receiver is configured to receive an OFDM signal. The non-OFDM transmitter comprises a mapping unit configured to, in a first transmission mode, map data targeting the multi-modulation receiver on a subcarrier signal, using a repetition code matching an OFDM symbol duration of the multi-modulation receiver. The non-OFDM transmitter further comprises a radio unit configured to transmit the subcarrier signal to the multi-modulation receiver. By choosing a repetition code matching the multi-modulation receiver, compatibility between the transmitted waveform and the multi-modulation receiver (also usable to concurrently receive OFDM signals), is ensured. Hence, the subcarrier signal can be decoded using the multi-modulation receiver.

According to some aspects, the mapping unit is configured to, in a second transmission mode, use another repetition code. This enables a transmitter that can transmit Long Range Low Power signals, such as e.g. "Bluetooth Low Energy-like signals", to different types of receivers. For example to one multi-modulation receiver with e.g. a repetition code of 1/16 and to a legacy Bluetooth Low Energy receiver with e.g. a repetition code of 1/1.

According to some aspects, the mapping unit is configured to switch between the first and second transmission modes. This enables a switch between transmission to different types of receivers e.g. between one multi-modulation receiver and one Classic Bluetooth receiver.

According to some aspects, the first and second transmission modes use different modulation schemes. The non-OFDM transmitter thus enables wireless devices that can switch between different modes, wherein the different modes are arranged to transmit signals using different modulation or repetition schemes such Bluetooth using GFSK and Zigbee (defined in 802.15.4) using OQPSK and BPSK.

According to some aspects, the repetition code is such that the accumulated duration of the repetitions of one symbol in the non-OFDM transmitter equals the duration of the input to the FFT plus the duration of a cyclic prefix, CP, of one OFDM symbol. With matching durations, the multicarrier signal can be processed by the FFT unit into multiple subcarrier signals, wherein the corresponding subcarriers are orthogonal with minimal inter symbol interference. The subcarriers used by the non-OFDM transmitter are thereby separated and can be decoded in a conventional manner.

According to some aspects, the disclosure also relates to a wireless device comprising a non-OFDM transmitter according to the present disclosure, the wireless device having all the advantages of the non-OFDM transmitter.

According to some aspects, the disclosure also relates to a method for receiving a multicarrier signal comprising data transmitted from multiple transmitters; wherein at least one of the transmitters is an Orthogonal Frequency-Division Multiplexing, OFDM, transmitter and wherein at least one of the transmitters is a receiver using a modulation scheme other than OFDM and wherein data transmitted from different transmitters are mapped to different subcarriers in the frequency domain. The method comprises receiving the multicarrier signal. The method further comprises removing a Cyclic Prefix, CP, from the multicarrier signal. The method also comprises separating data received from the individual transmitters by transforming the multicarrier signal in the time domain to multiple orthogonal subcarrier signals in the frequency domain. The method additionally comprises demapping, for each of the multiple transmitters, the corresponding subcarrier signals in accordance with the modulation scheme of the transmitter.

The method corresponds to the steps carried out by the multi-modulation receiver and the method therefore has all the advantages of the multi-modulation receiver.

According to some aspects, the different subcarriers are mutually orthogonal in the frequency domain. Having subcarriers that are mutually orthogonal in the frequency domain simplifies the separation of subcarriers of OFDM transmitters and transmitters using a modulation scheme other than OFDM. In particular, the step of demapping is greatly simplified since the output from the transformation to the frequency domain can be made by efficient processing; the modulation schemes of corresponding subcarrier signal are known and can be applied directly.

According to some aspects, the disclosure also relates to a computer program comprising computer program code which, when executed, causes a multi-modulation receiver to execute the method for receiving a multicarrier signal comprising data transmitted from multiple transmitters according to the present disclosure. The computer program has all the advantages of the method it carries out.

According to some aspects, the disclosure also relates to a method for transmitting data to a multi-modulation receiver, wherein the multi-modulation receiver is configured to receive an OFDM signal. The method comprises, in a first transmission mode, mapping data targeting the multi-modulation receiver on a signal, using a repetition code matching an OFDM symbol duration of the multi-modulation receiver. The method further comprises transmitting the subcarrier signal to the multi-modulation receiver.

According to some aspects, the method further comprises switching between the first and a second transmission mode, wherein the second transmission mode uses another repetition code. The method corresponds to the steps carried out by the non-OFDM transmitter and the method therefore has all the advantages of the non-OFDM transmitter.

According to some aspects, the disclosure also relates to a computer program comprising computer program code which, when executed, causes a wireless device comprising a non-OFDM transmitter to execute the method for trans-mitting data to a multi-modulation receiver. The computer program has all the advantages of the method it carries out.

BRIEF DESCRIPTION OF THE DRAWINGS

The foregoing will be apparent from the following more particular description of the example embodiments, as illustrated in the accompanying drawings in which like reference characters refer to the same parts throughout the different views. The drawings are not necessarily to scale, emphasis instead being placed upon illustrating the example embodiments.

DETAILED DESCRIPTION

Figure 1:
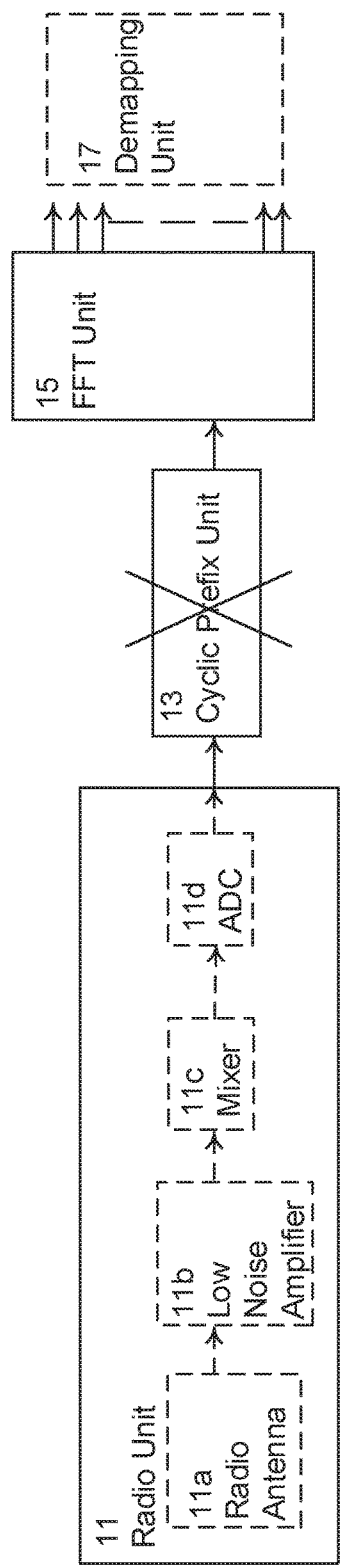
FIG. 1 illustrates an OFDM receiver according to the prior art.

The foregoing will be apparent from the following more particular description of the example embodiments, as illustrated in the accompanying drawings in which like reference characters refer to the same parts throughout the different views. The drawings are not necessarily to scale, emphasis instead being placed upon illustrating the example embodiments.

This disclosure proposes a dual mode receiver for use in a radio access point, here referred to as a network node. The network node is typically "dual mode" in terms of supporting two types of devices; low data rate devices, also referred to as IoT devices and high data rate devices. The idea is based on a system design that makes dual mode implementations attractive. More specifically it is proposed to let long range low power transmissions use a modulation scheme that is optimized for the low cost mode, i.e., the IoT device, but to do it in a way which makes complete reuse of the OFDM transmitter hardware. This allows the receiver hardware in the network node to separate signals from long range low power and high data rate wireless devices, using only one FFT.

For better understanding of the proposed transmitter a standard OFDM receiver and a single carrier receiver will now be described in more detail.

FIG. 1 illustrates an OFDM receiver according to the prior art. In one example, the OFDM receiver is arranged to receive signals using 802.11ax modulation. For simplicity all filters are omitted as they are irrelevant for the understanding of the proposed technique. A signal received by a radio antenna 11a of the OFDM receiver is amplified in a low noise amplifier 11b, LNA, where after it is down-converted to baseband frequency in a frequency mixer 11c. Whether this is done in one step using a so-called zero-IF or homodyne receiver, or whether it is done in two or more steps using a heterodyne receiver is not important. The proposed techniques presented below are applicable regardless. The baseband signal is then digitized and sampled in an analog-to-digital converter 11d, ADC. Once the signal is in the digital domain, time and frequency synchronization is typically performed, although not shown in the figure. Once time-synchronization is achieved, the cyclic prefix, CP, is removed, illustrated here by a cyclic prefix unit 13. The signal is then processed by a fast Fourier transform, FFT, unit 15, A demapping unit then demaps the data according to a mapping scheme of the signal.

Figure 2:
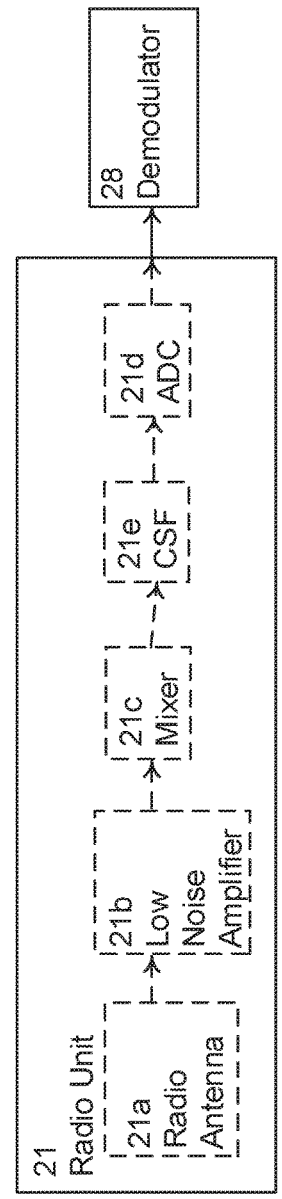
FIG. 2 illustrates an single carrier receiver according to the prior art.

FIG. 2 illustrates a single carrier receiver according to the prior art. According to some aspects, the single carrier receiver is a Gaussian Frequency-Shift Keying receiver, GFSK. Compared to the OFDM receiver of FIG. 1, the single carrier receiver explicitly includes a channel selective filter 21e, CSF, here placed before an ADC 21d. It is also possible to place it after the ADC 21d, or split the filtering so that part of the channel selective filtering is done in the analog domain and part is done is done in the digital domain. Exactly how this is done is not important for the disclosure. The single carrier receiver also comprises a demodulator 28 arranged to demodulate a received signal after being converted to digital format, and according to some aspects also having passed through at least one digital filter. According to some aspects, the demodulator 28 is a simple frequency discriminator for a GFSK signal.

Figure 3:
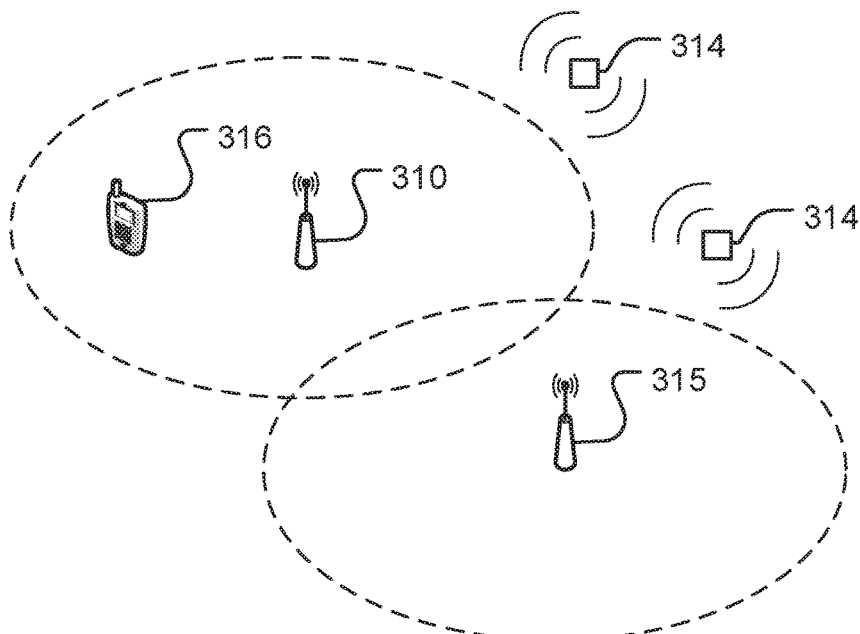
FIG. 3 illustrates a communication network where the inventive concept is applicable.

FIG. 3 illustrates a communication network where the proposed concept is applicable. The communication network comprises a network node 310 supporting two different types of wireless devices 314, 316, one able to transmit and receive high data rates 316, the other only able to transmit and receive considerably lower data rates 314. For example, the wireless device 316 able to transmit and receive high data rates is compliant with 802.11ax, and is thus able to transmit and receive signals where the nominal channel bandwidths are 20 MHz or more, e.g. 40, 80 or even 160 MHz. The other wireless device 314 is able to transmit and receive considerable lower data rates using e.g. Gaussian frequency shift keying, GFSK, which is the modulation used in e.g. Bluetooth Low Energy, BLE. The wireless device 314 is here referred to as a Long Range Low Power, LRLP, wireless device. In FIG. 3 wireless devices 314 are illustrated to be farther away from the network node 310 than wireless device 316. This is to highlight that the LRLP wireless device 314, due to its potentially much lower rate may have improved range compared to wireless device 316, but the relative placement of the different wireless devices has no impact on the proposed technique as such. The communication network also comprises a network node 315 which is only configured for communication with a communication scheme suitable for low power wireless devices 314. While a legacy low power wireless device might only be able to transmit suitable signals to a legacy network node 315, the illustrated wireless devices 3:14 need to be able to transmit suitable signals to both network nodes 310, 315. In order to achieve this some adaption may be required. This will be described in further detail in connection with FIG. 9.

OFDM is a natural choice when high data rate is to be supported as it allows for relatively low complex reception, which in turn depends on that the channel equalization is straightforward. On the other hand, for low data rates, which only require a narrowband channel, single carrier transmission may be preferable. In particular, single carrier modulation which has a constant envelope has some desirable features from a transmission point of view due to less strict requirements on transmitter linearity. The relaxed requirements are typically used to drive a power amplifier, PA, in the non-linear region, which in turns allow for significantly higher efficiency. An example of such a modulation is frequency shift keying, where the information is transmitted in the instantaneous frequency content of the signal. Another example is certain forms of phase shift keying, where the change of phase is done in a way such the envelope is not changed. Naturally, as the frequency is just the derivative of the phase with respect to time, one may even treat the modulation as either phase or frequency modulation depending on how the reception is performed.

At the same time Bluetooth Wireless Technology is based on Gaussian Frequency Shift Keying, GFSK. GFSK is a constant envelope modulation which allows for extremely cost efficient implementations. At the receiver side, one may use a simple limiting receiver, i.e., the analog-to-digital converter, ADC, may be replaced by a simple comparator and there will essentially be no need for automatic gain control, AGC, in the receiver, further simplifying the implementation and reducing the cost. Even more significant is the gain at the transmitter side. Due to that GFSK is constant envelope, there is no need to back-off the power amplifier, PA, and the linearity requirements for the PA are considerably less stringent, so that significantly higher power efficiency can be obtained. OFDM is known to suffer severely from a high peak-to-average-ratio, PAR, which means that less efficient transmission. Since an IoT device, such a sensor, may be powered by a coin battery, power efficiency is one of the key features.

As mentioned above LRLP is a new topic interest group within the IEEE 802.11 working group that will address the needs of Machine to Machine, M2M, IoT, Energy Management, and Sensor applications. LRLP is intended to leverage the mass-market Wireless Local Area Network, WLAN infrastructure for reliable, consistent, and stable access to Internet and "Cloud" services. It has been identified that an LRLP amendment should preferably be made such that LRLP support in the network node can be added at essentially no cost by reusing selected parts of the key features of the physical layer from 802.11ax. Although this clearly is an attractive property, it does not address the even more important question namely how to build extremely low cost and low power devices. As 802.11 technology, in particular 802.11ax, has some non-desirable properties for low cost and especially low power, it does not seem feasible for the low cost device.

As the exact format of LRLP is not yet defined, the term LRLP in this application relates to a long range low power non-OFDM signal, using any suitable single carrier modulation. For example it could be a "BLE-like" signal i.e. a signal using the same modulation scheme as Bluetooth Low Energy, BLE adapted for concurrent operation with OFDM.

This disclosure proposes to base LRLP on a modulation scheme that is optimized for the low cost mode, i.e., the sensor, but do it in a way which makes complete reuse of the OFDM receiver hardware in the network node possible. In this disclosure the examples are mainly using 802.11ax for the high-data rate application and Bluetooth Low Energy-like signals for the low data rate communication (also referred to as LRLP). However, it must be appreciated that the same principles are applicable to other present and future standards as well.

Figure 4:
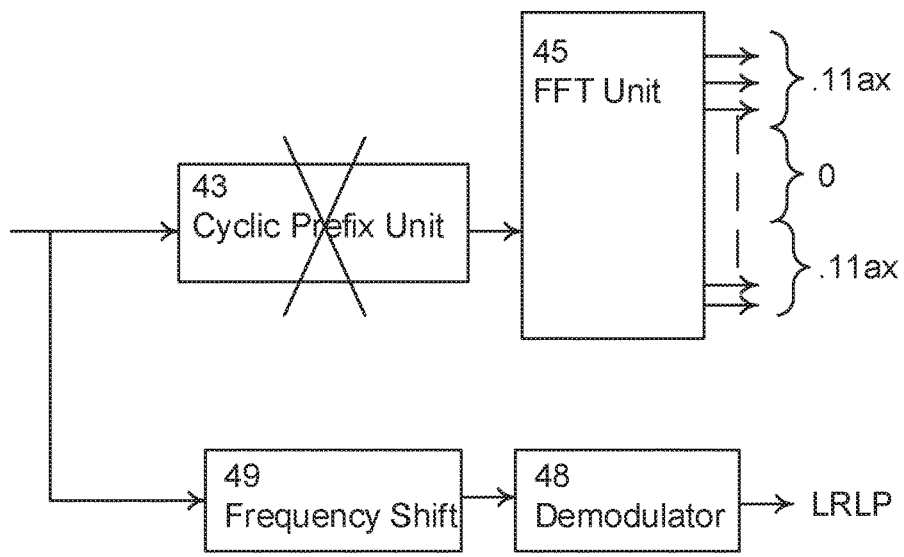
FIG. 4 illustrates how an LRLP signal and an 802.11ax signal can be demodulated.
Figure 5:
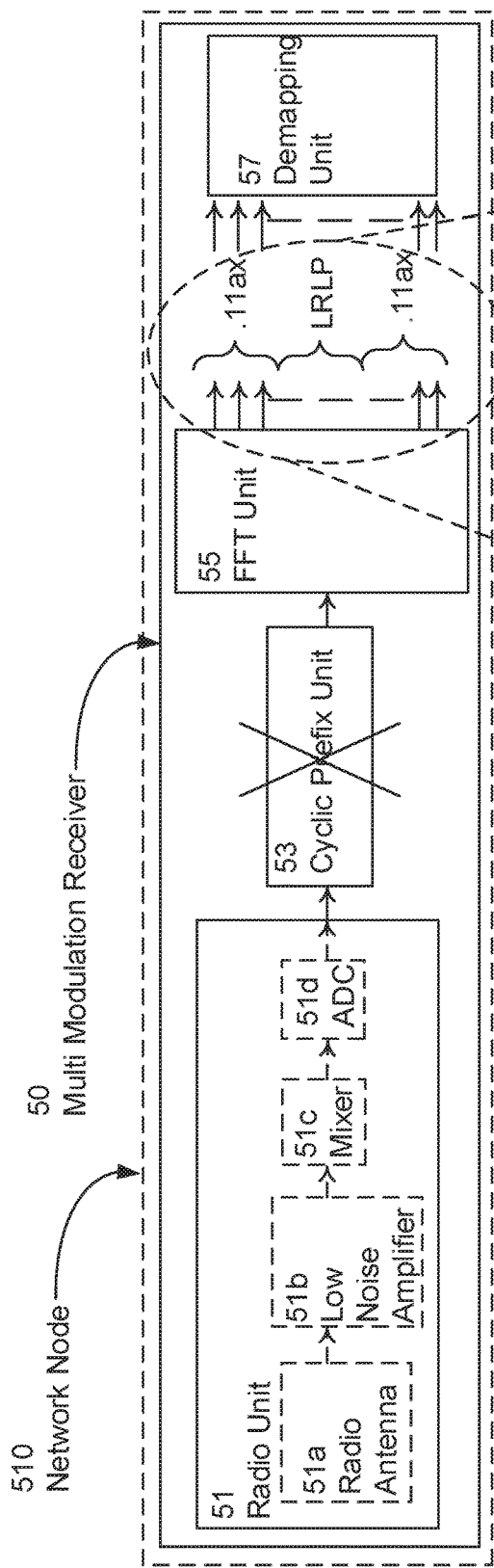
FIG. 5 illustrates a multi-modulation receiver and a network node according to some aspects of the disclosure, respectively.
Figure 5:
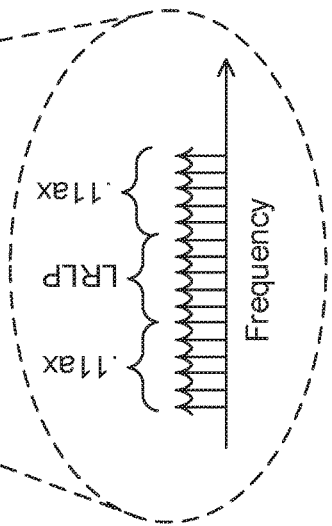

The disclosure proposes a receiver that allows the receiver hardware in the network node to demodulate a completely different modulation than used in 802.11ax, by selecting the parameters for the new modulation schemes in a specific way. The demodulation is done concurrently with the demodulation of the 802.11ax signal. The inset of FIG. 5 illustrates how the frequency spectrum is intended to be used. Some of the mutually orthogonal subcarriers are dedicated to 802.11ax signals and some are dedicated to single carrier LRLP signals. A straightforward way of extending the functionality of a network node to receive both signals of the standards is to provide the network node with a separate receiver for each standard, which will be discussed below in relation to FIG. 4. In order for a single receiver to be able to receive both signals concurrently, certain constraints must be put on the LRLP signals, which will be illustrated in relation to FIG. 5.

Hence, in the network node 310 in FIG. 3 needs to be able to concurrently receive data from single carrier and multi-carrier (e.g. OFDM) wireless devices. FIG. 4 illustrates a receiver configured to concurrently demodulate an LRLP signal using GFSK and an 802.11ax signal. As OFDM is suitable for high performance communication whereas constant envelope communication is suitable for low cost/low power communication, it can be expected that a network node preferably should be able to support both types of receptions concurrently.

One way to combine 802.11ax and LRLP reception is processing the 802.11ax signal by first removing the cyclic prefix in a cyclic prefix unit 43 (the cross-over is to denote that the cyclic prefix, CP, is removed, i.e. the reverse operation from the transmitter side where it is added) and then separating the subcarriers in an FFT unit 45 and at the output simply discard the subcarriers not used for 802.11ax, and then demodulate the LRLP signal separately using a GFSK receiver. Here the frequency shift is done by a frequency shift unit 49 so that the LRLP signal is centered around DC frequency, merely to illustrate that a following LRLP demodulator 48 is not affected by where in the 802.11ax signal the LRLP signal is located. Naturally, the frequency shift corresponds to those subcarriers that will not be used at the output of the FFT Unit 45.

However, such a solution implies that one demodulator is used for each respective standard. Although conceptually simple, it means additional complexity. Moreover, although some of the subcarriers are not used by the high data rate signal, it does not mean that placing a low-rate signal in the gap will ensure that signals do not interfere with one another, i.e., they will not necessarily be perfectly orthogonal. Also, just because the subcarriers located where the LRLP signal are not used, the LRLP signal will typically experience interference from the 802.11ax signal due to that it is not an OFDM signal but has very different spectral properties.

In contrast to the technique illustrated in FIG. 4, this disclosure presents a receiver configured to effectively receive both signals in the form of a multicarrier signal. Hence, the proposed receiver initially treats the composite signal transmitted from several wireless devices as being one multicarrier signal, although some of the wireless devices are non-OFDM transmitters. The underlying idea is that even the LRLP signal can be based on frequency modulation of some kind, which in principle can be demodulated by and FFT. However, in order to be able to use one single FFT, some system requirements needs to be fulfilled, which will be further discussed below.

By treating the composite signal as one multicarrier signal, it is ensured that both kinds of transmissions can be received with a single receiver. The present disclosure proposes to base LRLP on a modulation scheme that is optimized for the low cost mode, e.g., a sensor of an Internet of things, IoT, application, but do it in a way which makes complete reuse of a OFDM (e.g. 802.11ax) receiver hardware in the network node 310 possible. That is, the receiver hardware in the network node 310 is allowed to receive a completely different modulation than used in 802.11ax, by selecting the parameters for the new modulation schemes in a specific way. In other words, the systems need to be aligned and matched as will be described in relation to FIG. 11. By doing so, reuse of the receiving hardware is enabled.

FIG. 5 illustrates a multi-modulation receiver 50 and a network node 510 according to some aspects of the disclosure, respectively. The multi-modulation receiver 50 is configured to receive a multicarrier signal comprising data transmitted from multiple transmitters; wherein at least one of the transmitters is a transmitter using a modulation scheme other than Orthogonal Frequency-Division Multiplexing, OFDM, and wherein data transmitted from different transmitters are mapped to different subcarriers in the frequency domain. In other words, the multicarrier signal comprises a set of subcarriers dedicated to signals using said modulation scheme other than OFDM, while another set of subcarriers may be dedicated to signals from other transmitters.

The receiver and transmitter of this disclosure will be described in terms of functional units. The implementation of these units may be made in hardware and software or in a combination thereof. The receiver and transmitter typically also, depending on implementation, comprise other units that are not directly affecting the proposed functionality.

The multi-modulation receiver 50 comprises a radio unit 51 configured to receive the multicarrier signal. The multi-modulation receiver 50 comprises similar functional units as the OFDM receiver of FIG. 1, but with the added difference of how the units are configured. In order to integrate the functionality of an LRLP receiver, such as the one illustrated in FIG. 2, some constraints of the multicarrier signal are assumed. The OFDM and LRLP systems need to be synchronized and the respective signals matched. In particular, the receiver must be able to separate the subcarriers of multicarrier signal without losing any data in the process.

The cyclic prefix will be inserted into the multicarrier signal at the transmitter side and has to be removed by the multi-modulation receiver 50 in order to extract the data targeting the multi-modulation receiver 50 carried by the multicarrier signal. Accordingly, the multi-modulation receiver 50 further comprises a cyclic prefix unit 53 configured to remove a Cyclic Prefix, CP, from the received multicarrier signal. The cyclic prefix unit 53 is crossed over is to denote that the cyclic prefix, CP, is removed, i.e. the reverse operation from the transmitter side where it is added.

This block is standard in OFDM, and this is part of the elegance of the proposed solution. The LRLP signal is actually treated as containing a CP, although it does not. Thus, processing of the LRLP signal by using the FFT is allowed.

In one example the multicarrier signal comprises OFDM and LRLP subcarrier signals, wherein the LRLP subcarrier signals correspond to the signals from the transmitter using a modulation scheme other than OFDM. When the cyclic prefix is removed from the multicarrier signal, it is also removed from the LRLP subcarriers. In order to not lose any data at the multi-modulation receiver, a constraint of the multicarrier signal is that the same LRLP symbol is repeated on a respective LRLP subcarrier signal. When the cyclic prefix is removed from the multicarrier signal, a few of the repeated LRLP symbols are removed in the process. The remaining repeated LRLP symbols can be used to extract the data carried by the LRLP subcarrier signals. In one example, the OFDM system is compatible with 802.11ax, having an associated OFDM symbol duration of 16 µs, wherein the cyclic prefix duration is 3.2 µs. An LRLP symbol having a duration of 1 µs is then repeated 16 times to match the duration of an OFDM symbol. When the cyclic prefix is removed from the multicarrier signal, there are still about 13 LRLP symbols left on an LRLP subcarrier signal. Therefore, the LRLP signal can still be recovered with good performance.

After the cyclic prefix has been removed, the subcarrier signals need to be identified. Thus, the multi-modulation receiver 50 also comprises a Fast Fourier Transform, FFT, unit 55 configured to separate data received from the individual transmitters into mutually orthogonal subcarriers by transforming the multicarrier signal in the time domain to multiple orthogonal subcarrier signals in the frequency domain. The data of the multicarrier signal comprising data transmitted by several wireless devices 314, 316 arrives in the form of a data stream in the time domain. The FFT unit 55 transforms the multicarrier data streams to sub-streams of data to respective mutually orthogonal subcarriers in the frequency domain. Once the data received from the individual transmitters has been separated into mutually orthogonal subcarriers by the FFT unit 55, data received from different wireless devices may be separately decoded and processed.

Therefore, the multi-modulation receiver 50 additionally comprises a demapping unit 57 configured to, for each of the multiple transmitters, demap the corresponding subcarrier signals in accordance with the modulation scheme of the respective transmitter. In other words, after the cyclic prefix has been removed from the multicarrier signal by the cyclic prefix unit 53, the FFT unit 55 separates the subcarriers of the multicarrier signal according to the modulation scheme of the subcarriers. For instance, a multicarrier signal comprising subcarriers based on two different modulation schemes, OFDM 802.11ax and Bluetooth Low Energy-like, has its subcarriers separated according to the respective modulation scheme by the FFT unit 55. The data demapping unit 57 subsequently converts or demaps the received symbols to data in accordance with the modulation scheme of the respective subcarriers.

The demapping unit 57 typically applies a repetition code matching an OFDM symbol duration of the OFDM transmitter. Matching implies that the accumulated duration of the repetitions of one symbol in the LRLP transmitter equals the duration of the input to the FFT plus the duration of a cyclic prefix, CP, of one OFDM symbol in the OFDM transmitter. The repetition code is typically provided e.g. signaled, beforehand. As one consequence of the symbol repetition, the removal of the cyclic prefix does not need to affect the interpretation of the symbols.

To sum up, the proposed technique enables a single receiver, or a network node comprising a single receiver, which supports concurrent reception of different types of wireless devices, one able to transmit and receive high data rates, the other only able to transmit and receive considerably lower data rates.

The multi-modulation receiver 50 provides an effective means to enable demodulation of both OFDM-compliant signals and signals that are not OFDM-compliant in a way that ensures that they are effectively orthogonal to one another. In doing so, it is ensured that both kinds of transmissions can be received in a cost effective and power efficient way at the same time as the corresponding transmitters for the two different standards are also are optimized for their respective purposes.

The multi-modulation receiver 50 preferably base a Long Range Low Power mode on a modulation scheme that is optimized for a low cost mode, i.e., an Internet of thing, IoT, application, but do it in a way which makes complete reuse of 802.11ax receiver hardware in the network node 510 possible. That is, the receiver hardware in the network node 510 is arranged to demodulate a completely different modulation than used in 802.11ax, by selecting the parameters for the new modulation schemes in a specific way. The demodulation is done concurrently with the demodulation of an 802.11ax signal. By doing so, not only is reuse of the hardware ensured, but also that the 802.11ax signal and the LRLP signals are almost perfectly orthogonal to one another once the CP has been removed.

The multi-modulation receiver 50 thereby provides a means for truly low cost low power devices as well as full reuse of 802.11ax hardware in the network node 510. The multi-modulation receiver 50 also covers the case that the network node 510 receives a Bluetooth Low Energy, BLE, like signal, which has the desirable feature that it allows for efficient implementation of a dual mode BLE and LRLP receiver.

According to some aspects, at least one of the multiple transmitters, from which the multi-modulation receiver is configured to receive transmissions, is an OFDM transmitter. OFDM is a multicarrier frequency modulation scheme where subcarriers carrying the signal are closely spaced, typically overlapping, modulated carriers. Since data that is to be transmitted with an OFDM signal is distributed over the subcarriers, the data rate of each subcarrier is reduced, which greatly reduces the sensitivity to interference due to reflections, as well as inter symbol and inter frame interference. The closely spaced subcarriers of OFDM also lead to good spectral efficiency. OFDM is a natural choice when high data rate is to be supported as it allows for relatively low complex reception, which in turn depends on that the channel equalization is straightforward.

According to some aspects, the transmitter using a modulation scheme other than OFDM, from which the multi-modulation receiver is also configured to receive transmissions, has a lower data rate than the OFDM transmitter. The lower data rate facilitates implementation of a Long Range Low Power, LRLP, signal with similar properties as Bluetooth Low Energy. The lower data rate provides an approach to increase the range of a communication link. Since a low data rate can be supported by using a single subcarrier, employing a single subcarrier using a suitable modulation scheme provides a means to improve energy efficiency. According to some further aspects, the data of the LRLP signal is mapped based on Gaussian frequency shift keying, GFSK, and demapped by the demapping unit 57 accordingly. The advantages of a Bluetooth Low Energy like signal having a constant envelope has been described above and mapping the LRLP signal based on GFSK provides the advantageous properties of Bluetooth Low Energy like signal.

According to some aspects, the OFDM transmitter operates in accordance with IEEE 802.11 or 802.11ax. Accordingly, the multi-modulation receiver 50 is arranged to receive a multicarrier signal comprising an OFDM signal compliant with 802.11ax, suitable for high data rates. According to some aspects, the data of the 802.11ax signal is mapped according to one of quadrature amplitude modulation, QAM, quadrature phase-shift keying, QPSK, or binary phase-shift keying, BPSK, and demapped by the demapping unit 57 accordingly. While QAM supports higher data rates, BPSK and QPSK may provide better robustness.

According to some aspects, the transmitter using a modulation scheme other than OFDM is a single carrier transmitter. Single carrier transmission may be preferable for low data rates, which only require a narrowband channel. In particular, single carrier modulation which has a constant envelope has some desirable features from a transmission point of view due to less strict requirements on transmitter linearity. The relaxed requirements are typically used to drive a power amplifier, PA, in the non-linear region, which in turns allow for significantly higher efficiency.

According to some aspects, the transmitter using a modulation scheme other than OFDM is a Frequency-Shift Keying, FSK, transmitter. Modulation based on frequency has the advantage of avoiding many of the problems associated with large amplitude variations of the signal. Also, the use of nonlinear amplifiers is enabled, which allow for significantly higher efficiency than linear amplifiers.

According to some aspects, the demapping unit 57 is configured to demap the data such that the demapping is performed based on output amplitudes after the transformation to the frequency domain. This enables the use of a multicarrier signal where the subcarrier signals using a modulation scheme other than OFDM employs Binary Frequency-Shift Keying, BFSK, wherein two mutually orthogonal subcarriers are used to represent a one and a zero, respectively. The subcarriers used to represent a one and a zero will not both be used at the same time, which facilitates a straightforward identification of the ones and zeroes by the FFT unit.

According to some aspects the disclosure also relates to a network node 510 in a wireless communication network comprising a multi-modulation receiver 50 according to the present disclosure. A network node in this application generally refers to a radio base station or access point, i.e. a radio network node capable of transmitting radio signals to a wireless device and receiving signals transmitted by a wireless device.

Figure 6:
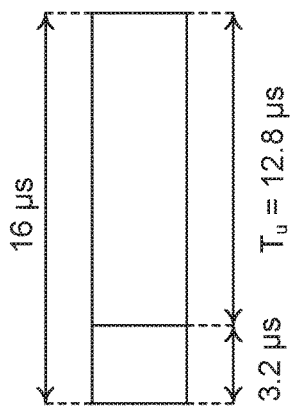
FIG. 6 illustrates cyclic prefix and data block durations of an OFDM symbol.

FIG. 6 illustrates cyclic prefix and data block durations of an OFDM symbol. As stated above, orthogonality between signals using an OFDM modulation scheme and signals using a modulation scheme other than OFDM can be resolved by a suitable choice of cyclic prefix, CP. The total duration of an OFDM symbol equals the duration of the signal at the output of an IFFT unit plus the duration of the CP. The reason for this is to simplify reception by ensuring that inter symbol interference, ISI, easily can be dealt with. The CP can be seen as overhead and does reduce the net data rate. Because the CP is overhead, it should be selected as short as possible, but still long enough to ensure that ISI easily can be handled at the receiver side. In practice this means selecting the length of the CP to be at least as long as the channel's excess delay, i.e., the length of the channel's impulse response where the impulse response is essentially non-zero. Determination of the cyclic prefix will be illustrated for 802.11ax. For 802.11ax, it has been decided that the CP length can be 0.8 µs, 1.6 µs or 3.2 µs. The illustrated OFDM symbol consists of a 12.8 µs long "useful" part which is the output of the IFFT unit and the cyclic prefix. According to the proposed technique, the selection of CP length is not only based on that channel conditions but also on the symbol rate of the low data rate system, i.e., the system that is not actually based on OFDM.

According to some aspects, the Cyclic Prefix is selected such that the duration of the output of an IFFT unit at the transmitter side plus the duration of the Cyclic Prefix is N times the duration of a symbol using a modulation scheme other than OFDM, where N is an integer. The reason for this choice is that the low rate system then can treat the signal as a symbol being repeated N times, which allows simple processing and also ensures that symbol boundary for the OFDM symbols are aligned with the symbol boundary with the low rate system. If N is not an integer it follows that effectively the LRLP signal would experience a discontinuity in between (some of) the OFDM symbols.

For the example above, suppose that the symbol rate for LRLP is 1 Msymbol/s, then it is easily seen that only CP=3.2 µs results in N being an integer as 12.8 µs+3.2 µs=16 µs, i.e., N=16.

To further describe the proposed technique, consider a nominal channel bandwidth of 20 MHz and that the signal is generated using a 256 point inverse fast Fourier transform, IFFT, so that the subcarrier spacing becomes 20/256 MHz=78.125 kHz. Then the duration of one OFDMA symbol is 256/20 µs=12.8 µs, not including the cyclic prefix. This corresponds to what is used in 802.11ax.

As is proposed for IEEE 802.11ax, orthogonal frequency division multiple access, OFDMA, is used to allow simultaneous transmission to and from several wireless devices.

Figure 7:
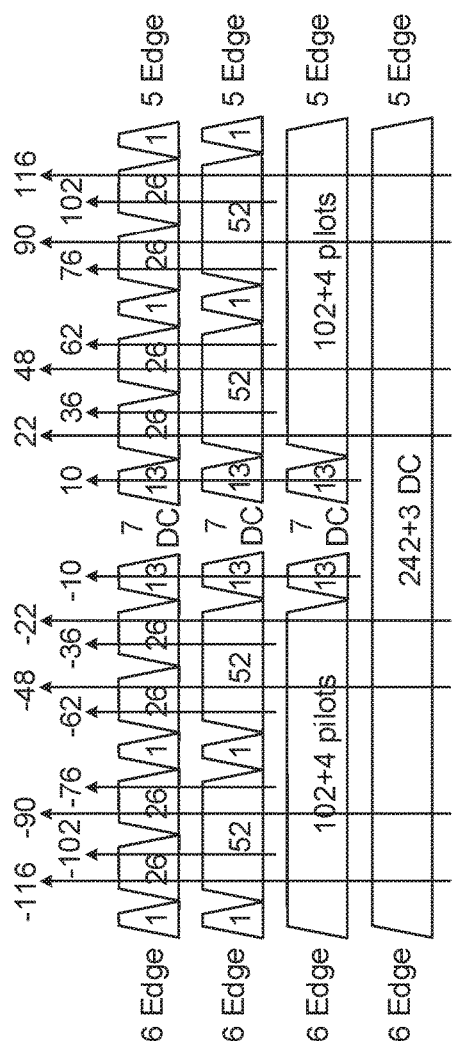
FIG. 7 illustrates different resource units according to some aspects of the disclosure.

FIG. 7 illustrates different resource units according to some aspects of the disclosure. A case of 20 MHz allocation is chosen to illustrate the principles of the proposed technique. The frequency domain within the available bandwidth is divided into resource units. The resource units are then assigned different purposes, e.g. a resource unit may be allocated to transmit information to or from a wireless device. The actual definition of the resource units and their assignment follow different predefined allocation rules depending on desired behavior.

Figure 8:
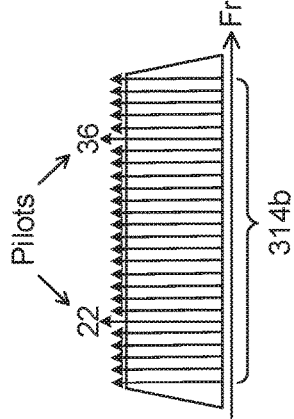
FIG. 8 illustrates a 26 subcarrier wide resource unit according to some aspects of the disclosure.

This will now be further explained referring to FIGS. 7 and 8. Depending on how much information should be received from a high rate wireless device, the wireless device can be allocated more or less of the total available bandwidth. According to FIG. 7, the smallest resource unit, RU, is 26 subcarriers, which corresponds to a bandwidth of about 2 MHz (26*78.125 kHz=2.031 MHz). In general, a wireless device may be allocated a 26 subcarrier RU, a 52 subcarrier RU, a 106 subcarrier RU, or the full bandwidth which corresponds to 242 subcarriers. Although we may assume that a network node supports transmission and reception over the entire 20 MHz bandwidth, we are only concerned with the reception to the network node from the two different kinds of wireless devices. If there are two or more wireless devices of one kind, this can also be supported by the very same methodology.

In FIG. 7, which is a rather detailed figure of possible allocation of users in a 20 MHz channel, the exact usage of the different subcarriers is shown. The different RU sizes mentioned above and how they are placed are clearly shown, as are the location of the pilot tones, in the figure marked as arrows. Pilot tones are tones that are known by the receiver and therefore can be used by the receiver to perform e.g. channel estimation. If only 802.11ax wireless devices were to be supported, the different RU could be allocated to different wireless devices in a suitable way, with possibly varying RU sizes allocated to the different wireless devices. In what follows, suppose that the $6^{th}$ RU consisting of 26 subcarriers is not used for an 802.11ax wireless device, but instead the corresponding frequencies are to be used to generate a signal that can be demodulated by a receiver for LRLP.

This 26 subcarrier RU is shown in some more detail below, see FIG. 8. This would correspond to a subcarrier separated in the frequency domain in accordance with predefined allocation rules.

The present disclosure also relates to a wireless device 314 configured for transmitting data to the multi-modulation receiver 310 described above. A situation where this is needed is when a wireless device tries to communicate with a network node comprising a multi-modulation receiver according to the present disclosure. Referring to FIG. 3, the wireless device 314 is for example a wireless device implementing an Internet of things, IoT, application. The data rate needed to be transmitted by the wireless device 314 is typically very low, such as a long range low power, LRLP, wireless device. Typically, such wireless IoT devices are configured to transmit signals having a modulation scheme suitable for LRLP communication. For example the wireless devices 314 are also configured to transmit data to a legacy network node 315 arranged to receive signals from the LRLP wireless devices 314 using e.g. Classic Bluetooth or Bluetooth Low Energy.

In the example of FIG. 3 the network node 310 receives a multicarrier signal comprising data transmitted from the wireless device 314. Hence, the wireless device 314 needs to be able to transmit information suitable for a multicarrier signal to be received by the multi-modulation receiver 310. This will be further explored in relation to FIG. 9, below.

Figure 9:
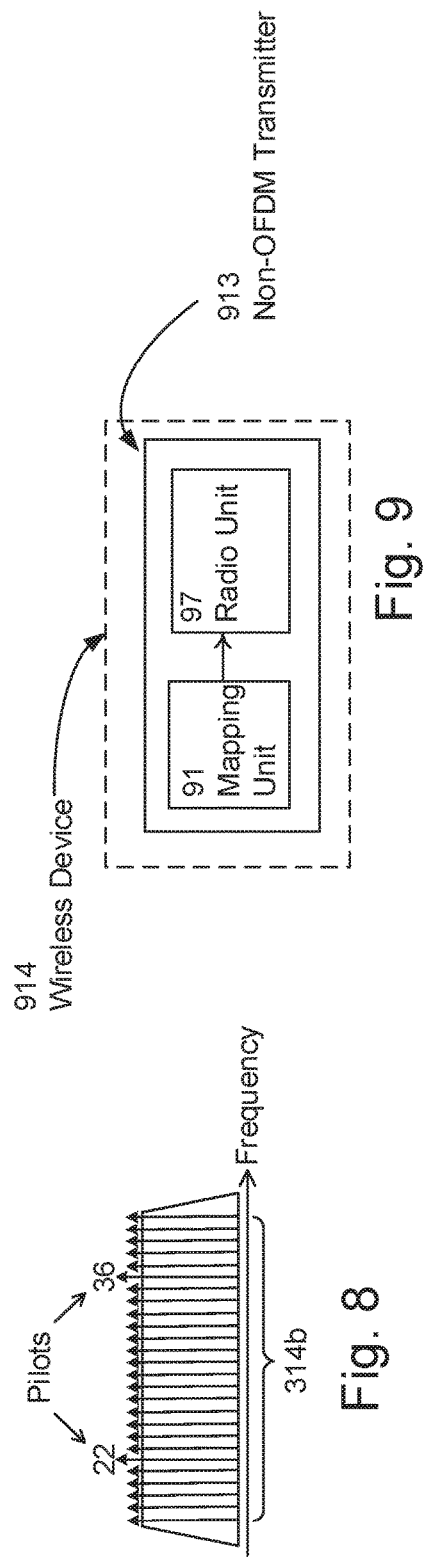
FIG. 9 illustrates a non-OFDM transmitter and a wireless device according to some aspects of the disclosure, respectively.

FIG. 9 illustrates a non-OFDM transmitter 9:13 and a wireless device 9:14 according to some aspects of the disclosure, respectively. The non-OFDM transmitter 913 is for example one of the transmitters using a modulation scheme other than OFDM, to which a multi-modulation receiver 310 according to the present disclosure, as has been illustrated in relation to FIG. 5 above, receives a multicarrier signal. The principle is similar to when transmitting a single carrier signal.

The non-OFDM transmitter comprises a mapping unit 91 configured to, in a first transmission mode, map data targeting a multi-modulation receiver on a subcarrier signal, using a repetition code matching an OFDM symbol duration of the multi-modulation receiver. Mapping is a process that maps a (digital) data stream to an (analog) representation called a symbol. In addition to mapping data to symbols, the mapping unit 91 must ensure that the duration of the transmitted symbols matches an OFDM symbol duration of the multi-modulation receiver. As stated above, GFSK is the modulation used in Bluetooth Low Energy, BLE. In this example the non-OFDM transmitter enables a Long Range Low Power, LRLP, wireless device able to communicate with a multi-modulation receiver according to the present disclosure. In addition to mapping data to symbols, the mapping unit 91 must ensure that the duration of the transmitted symbols matches an OFDM symbol duration of the multi-modulation receiver. Typically, the duration of the symbols of the non-OFDM transmitter is much shorter than the duration of the OFDM symbol duration. Since the multi-modulation receiver expects subcarrier signals having a duration matching the OFDM symbol duration, the mapping unit 91 accounts for the mismatch in symbol duration by transmitting the same symbol several times in succession. The number of times the symbols of the non-OFDM is repeated is determined by the repetition code. Thus, in one example, the repetition code employs N-fold repetition, so that the accumulated duration of the N repetitions of one symbol in the non-OFDM transmitter equals the duration of the input to the FFT plus the duration of a cyclic prefix, CP, of one OFDM symbol.

According to some aspects, the mapping unit 91 is configured to, in a second transmission mode, use another repetition code. In order for the non-OFDM transmitter to be able to also transmit signals to legacy receivers arranged to receive signals using only the modulation scheme of the non-OFDM receiver, a second transmission mode using another repetition code may be provided. In the second transmission mode there is no need to match durations of different types of symbols and the repetition code can be set to e.g. 1/1, i.e. no symbols repeated. The second mode could for instance correspond to that BLE is used.

According to some aspects, the mapping unit 91 is configured to switch between the first and second transmission modes. By being able to switch between the first and second transmission modes, the non-OFDM transmitter 913 can work with both legacy receivers, e.g. the legacy network node 315 in FIG. 3, and multi-modulation receivers according to the present disclosure. Since the reception modes can be configured by adjusting reception parameters, e.g. the repetition code, the need for additional hardware with respect to legacy transmitters is eliminated.

According to some aspects, the first and second transmission modes use different modulation schemes. The first mode may be tailored to match the OFDM symbol duration including the CP, whereas the second may correspond to BLE or Classic Bluetooth.

The non-OFDM transmitter 913 further comprises a radio unit 97 configured to transmit the subcarrier signal to the multi-modulation receiver.

According to some aspects, the present disclosure also relates to a wireless device 914 comprising a non-OFDM transmitter 913 according to the present disclosure. Within the context of this disclosure, the terms "wireless terminal" or "wireless device" encompass any terminal which is able to communicate wirelessly with another device, as well as, optionally, with an access point of a wireless network) by transmitting and/or receiving wireless signals. Thus, the term "wireless terminal" encompasses, but is not limited to: a user equipment, e.g. an LTE UE, a mobile terminal, a stationary or mobile wireless device for machine-to-machine communication, an integrated or embedded wireless card, an externally plugged in wireless card, a dangle etc. Throughout this disclosure, the term "user equipment" is sometimes used to exemplify various embodiments. However, this should not be construed as limiting, as the concepts illustrated herein are equally applicable to other wireless nodes. Hence, whenever a "user equipment" or "UE" is referred to in this disclosure, this should be understood as encompassing any wireless terminal as defined above. The wireless device 914 has all the advantages of the non-OFDM transmitter 913.

Different embodiments of multi-modulation receivers will now be illustrated. Unless stated otherwise, the multi-modulation receivers are arranged to receive signals from a system using an OFDM modulation scheme, in particular 802.11ax signals, and signals from a system using a modulation scheme other than OFDM. The emphasis will be on illustrating different modulation schemes other than OFDM. The signals using a modulation scheme other than OFDM will typically be transmitted from low power low data rate systems and will be referred to as long range low power, LRLP, signals.

Example Implementation Using Binary Frequency-Shift Keying

In one example, the modulation used for the low data rate system is based on binary FSK, i.e., a logical zero is transmitted using one frequency and a logical one is transmitted using another frequency, i.e., upon using the FFT for demodulating the signal, the demodulation is based on considering two of the subcarriers at the output of the FFT and exploiting that one of the two subcarriers is used but not both at the same time. The two frequencies are preferably selected to coincide exactly with the frequencies of two subcarriers. However, even if this is not possible one should select two of the subcarriers that are closest. It is also possible to use more than two subcarriers for the detection, which may be especially useful if the mismatch between the LRLP signal and the subcarrier frequencies is relatively large. Here relative refers to the frequency distance between two subcarriers. Furthermore, it may be required to use a few of the subcarriers as guardband between the LRLP signal and the .11ax signal. Referring to FIG. 8, one possibility would be to only use subcarrier 22 and subcarrier 36 for LRLP and not use the other subcarriers at all. This would be somewhat wasteful, but would probably ensure that the interference between LRLP and 802.11ax would be sufficiently small. Note that this embodiment also covers the situation where the spectrum of the transmitted signal is shaped, e.g. through the use of windowing between the OFDM symbols. A receiver for the signal may or may not be perfectly aware of the signal waveform as part of the waveform is not used due to that the cyclic prefix, CP, is discarded as discussed above. In one example, the LRLP signals are Bluetooth Low Energy-like signals and are received at a symbol rate of 1 Msymbol/s and the frequency separation between the two frequencies representing a logical zero and a logical one is 500 kHz (The modulation index used for BLE is h=0.5, which means that the frequency deviation from the carrier is +−250 kHz). Since the subcarrier spacing for a 256 point IFFT of an 802.11ax transmitter is 78.125 kHz, it is not possible to exactly obtain +−250 kHz, but since 3*78.125 kHz=234.375 kHz is a rather good approximation, one may use these subcarriers for decision. In this particular case, the effective data rate would be 62.5 kb/s, since the symbol rate is 1 Ms/s and the code rate is 1/16.

Figure 10:
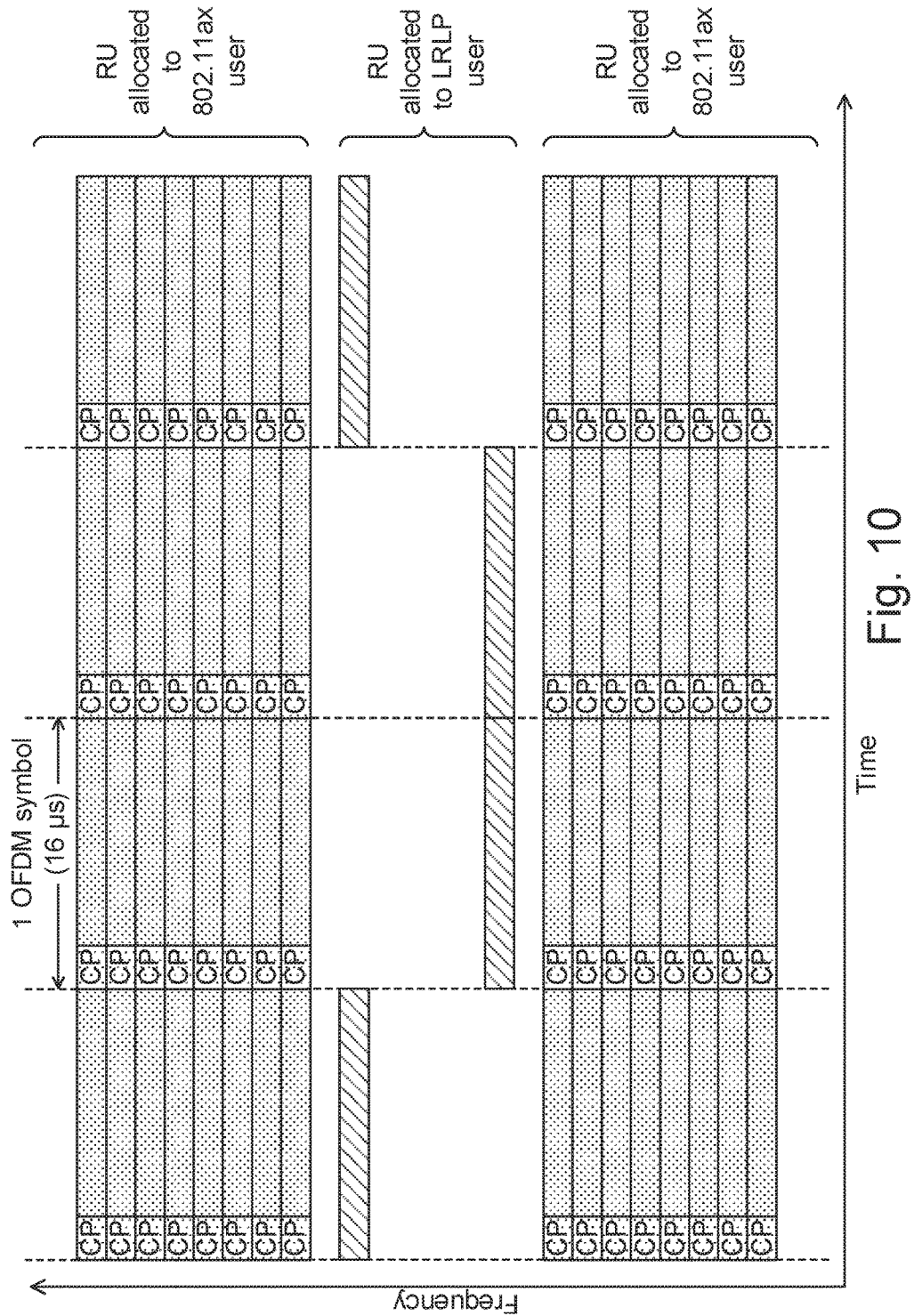
FIG. 10 illustrates resource unit allocation in the time-frequency plane according to some aspects of the disclosure.
Figure 11:
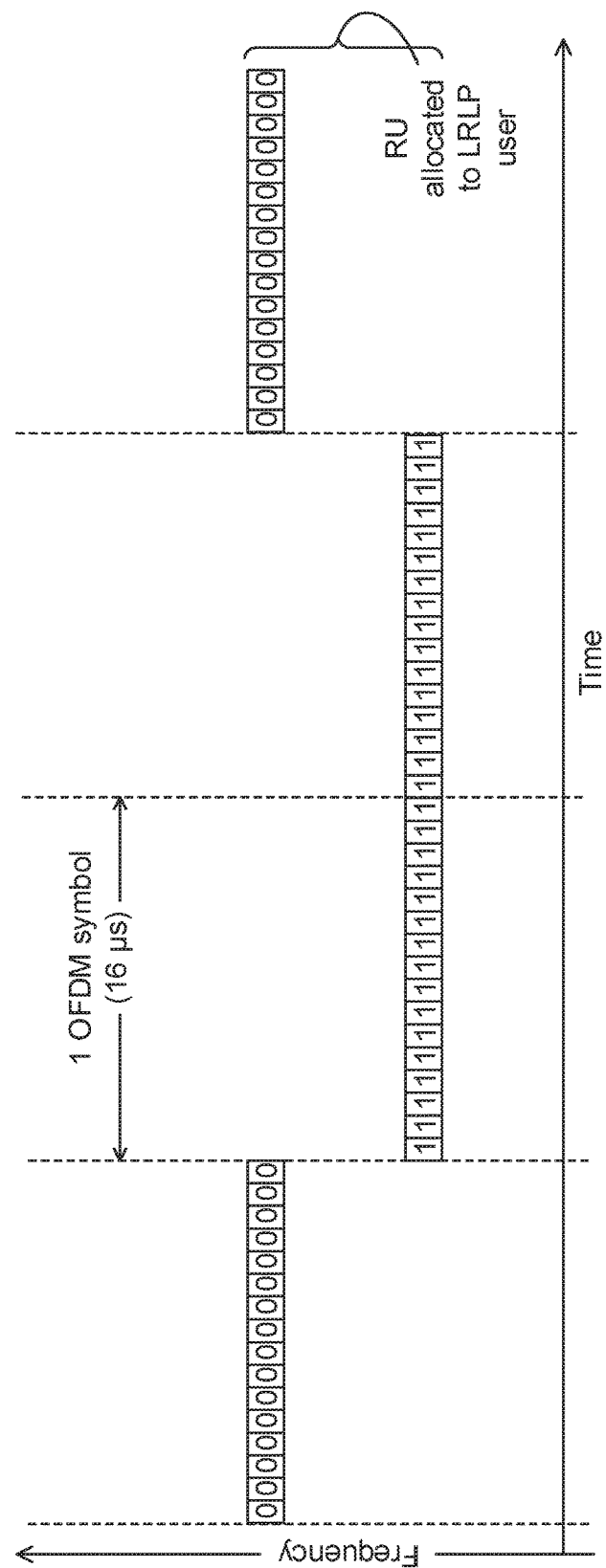
FIG. 11 illustrates an LRLP signal according to some aspects of the disclosure.

FIG. 10 illustrates resource unit allocation in the time-frequency plane according to some aspects of the disclosure. In particular, an example with an OFDM symbol duration of 16 μs and two BLE subcarrier signals, wherein the respective BLE-like subcarriers represent a logical one and a logical zero. FIG. 11 illustrates an LRLP signal according to some aspects of the disclosure, wherein the BLE-like subcarrier signals employ a rate 1/16 repetition code. Each LRLP symbol is repeated 16 times, an OFDM symbol duration of the multicarrier signal.

It is worth pointing out that the multi-modulation receiver initially treats the composite signal as being OFDM and removes the CP, although there by definition is no CP in the LRLP signal. This may seem somewhat wasteful, as part of the received energy is removed. However, the use of a CP also allows for proper reception without very strict time-alignment. In addition, the LRLP signal would not in practice be generated as a "pure" FSK signal, but rather as a filtered FSK in the form of Gaussian FSK in order to ensure a better transmit spectrum. The filtering will however result in that the signals, if processed by the FFT unit, would not be orthogonal. However, the effect of filtering is typically limited to a fraction of a symbol interval, say half a symbol interval which with the numerical vanes above would correspond to 0.5 μs. Now, if the LRLP signal is 16 μs due to repetition coding, there will be about 15 μs in the center of each 16 μs sequence that will not be impacted by the filtering. Thus, as the multi-modulation receiver removes a CP corresponding to 3.2 μs, the part of the received signal that is actually impacted by this pulse shape filtering is almost entirely removed.

To allow for increased the data rate, one may use a smaller FFT at the same sampling rate. If for instance a 128 points FFT is used at a sampling rate of 20 MHz, the duration of the output of the FFT is 6.4 and then by adding a CP of 1.6 μs we obtain a total duration of an OFDM symbol that equals 8 μs, effectively resulting in a data rate of 125 kb/s.

In another example, the symbol rate of the low data rate system is 2 Msymbol/s, and the two frequency deviations are scaled accordingly so that they are +−500 kHz. In this case the 500 kHz could be approximated by 6*78.125=468.75 kHz. However, as a FSK receiver will only rely on the absolute difference between the two frequencies, the subcarriers may be selected to be at a distance of 13 subcarriers, which resets in that the frequency difference between the two subcarriers becomes 13*78.125=1015.625 kHz. Compared to the ideal case of 1 MHz, there is just a 1.6% difference.

Figure 12:
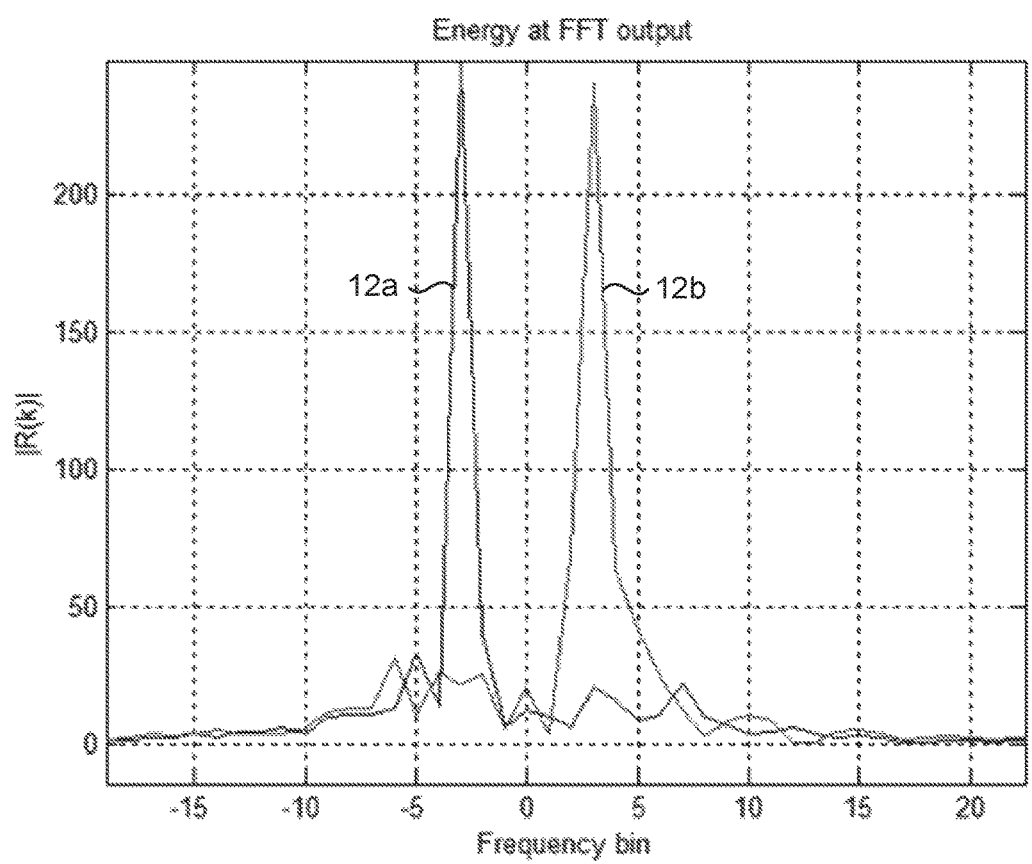
FIG. 12 illustrates amplitudes at the output of an FFT unit in case a zero and one is received, respectively.

In the discussion above we have assumed that a BLE transmitter should transmit GFSK with a modulation index of 0.5 and then the reception should be based on using a FFT unit of a multi-modulation receiver. In FIG. 12 the output amplitudes 12a, 12b at the different bins of the FFT unit are shown. A straightforward way to decide whether the transmitted signal was a zero or a one is to select the one for which the corresponding frequency bin has the largest amplitude. In FIG. 12, and as explained above, the two frequency bins preferably used for detection are those +−3 from the one at DC (frequency bin 0), corresponding to about 235 kHz.

Figure 13:
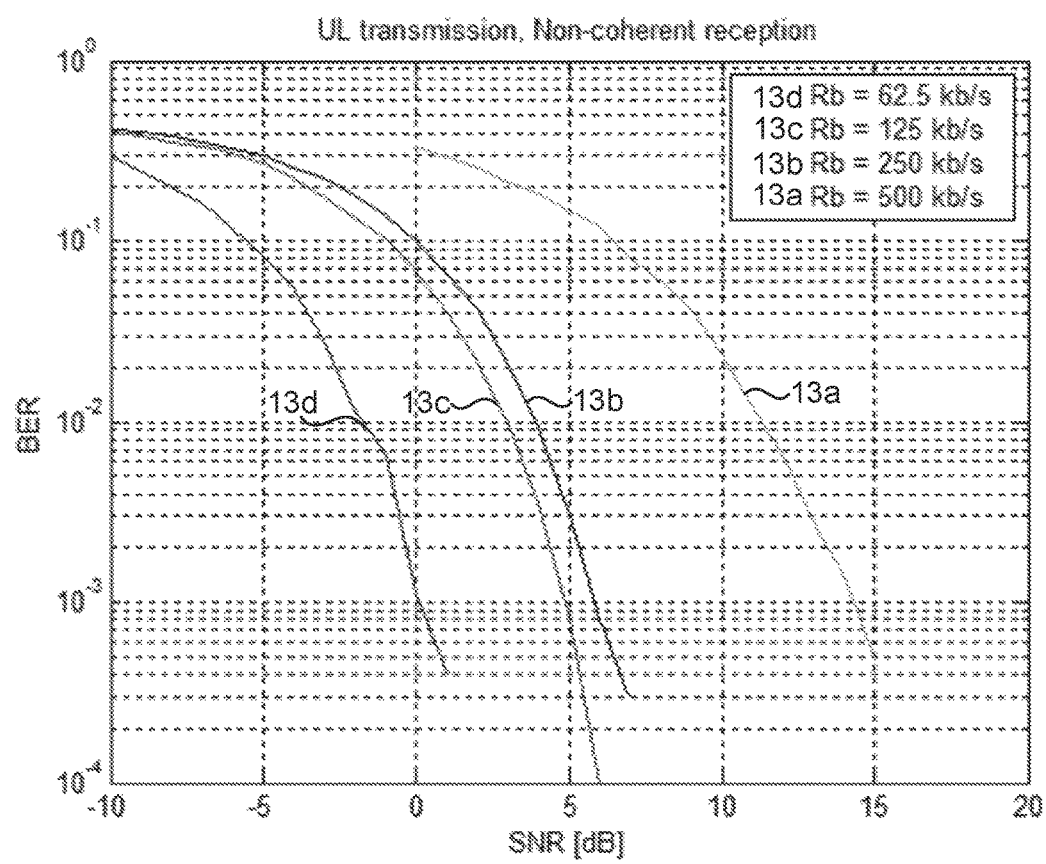
FIG. 13 illustrates simulated performance for non-coherent reception at different bit rates according to some aspects of the disclosure.

As discussed above, it also possible to support higher data rate using the same frequency deviations at the transmitter side. According to some aspects, this is achieved by using a smaller size FFT and use a correspondingly larger code rate. For example, one may use FFT sizes 128, 64, 32, with corresponding code rates 1/8, 1/4, and 1/2. In doing so, the frequency bin separation will increase correspondingly. This is illustrated in FIG. 13, where the performance is shown for four different data rates 13a, 13b, 13c and 13d obtained using respective FFT sizes of 32, 64, 128, and 256, with corresponding cyclic prefix durations of 0.4, 0.8, 1.6, and 3.2 μs.

Figure 14:
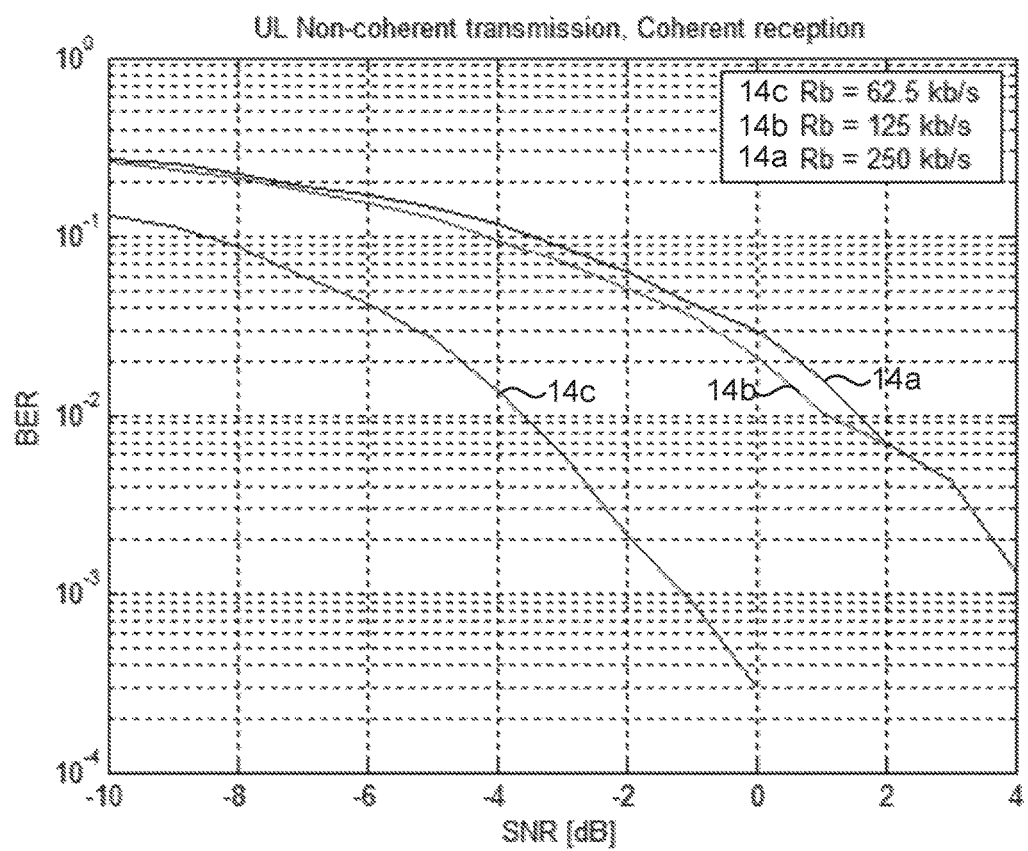
FIG. 14 illustrates simulated performance for coherent reception at different bit rates according to some aspects of the disclosure.

A nice property of using the amplitudes at the output of the FFT unit is that one does not need any phase reference, i.e., the reception is non-coherent. The drawback with non-coherent reception is that the performance is degraded with respect to coherent detection. In another example coherent reception is used, which relies on that a phase reference is obtained in some way. With a phase reference available, the phases of the frequency bins relative to the phase reference can be determined. It is then possible to compare which ones of the frequency bins has e.g. the largest in-phase component (real part of the output), rather than considering the amplitude. The amplitudes are typically more sensitive to noise than the phases, which means that coherent reception, e.g. by comparing in-phase components of frequency bins, typically experience improved performance. FIG. 14 illustrates simulated performance for coherent reception at different bit rates according to some aspects of the disclosure. In all cases the LRLP symbol rate is 1 Msymbol/s.

One may intuitively expect that the gain in sensitivity should be 3 dB if the data rate is reduced a factor of two. As can be seen in both FIG. 13 and FIG. 14, this is not the case. The explanation for this is that if there is a mismatch between the frequency of the bin used for detection and the actually transmitted frequency, additional degradation will be experienced. It is straight forward to show that this additional degradation can be expected to be $$20\log_{10}sinc\left(\frac{f\_missalign}{\Delta f}\right)$$

where f_missalign is the frequency is frequency mismatch and Delta f is the subcarrier spacing for the FFT size used for demodulation.

In one example, more than the two frequency bins are used for making the decision if the mismatch is large. By using more than two frequency bins for making the decision, the additional degradation due to the frequency mismatch can be significantly reduced, and in theory be made as small as desired.

Example Implementation Using Multi-Level Frequency-Shift Keying

According to some aspects, the multi-modulation receiver is arranged to receive the LRLP subcarrier signals using M-level FSK, where M preferably is a power of two, i.e., M=4, 8, . . . , although in principle also other values of M is possible. That is, one out of M subcarriers is used by a transmitter for transmitting the information in each OFDM symbol of the other modulation scheme. M-level FSK is a means to increase the data rate compared to the binary case, i.e., M=2.

Example Implementation Using Binary Phase-Shift Keying

In one example, the multi-modulation receiver is arranged to receive the LRLP subcarrier signals using Binary Phase-Shift Keying, BPSK. By selecting the phase of the subcarrier as a function of the information the LRLP binary data is transmitted using only one subcarrier. In this case, it is assumed that the multi-modulation receiver is performing the reception using a phase reference, i.e., coherent reception is assumed. The coherent reception has a positive impact on performance, particularly for a low signal-to-noise-ratio, SNR.

Example Implementation Using Multi-Level Phase-Shift Keying

In one example, the mufti-modulation receiver is arranged to receive the LRLP subcarrier signals using M-level PSK. M preferably is a power of two, i.e., M=4, 8, . . . , although in principle also other values of M is possible. M-level PSK is a means to increase the data rate compared to the binary case, i.e., M=2.

Example Implementation Using Differential Binary Phase-Shift Keying

In one example, the multi-modulation receiver is arranged to receive the LRLP subcarrier signals using Differential BPSK. Differential BPSK means that the information is not transmitted in the absolute phase, but instead in the phase change from the previous symbol. This allows for considerably simpler reception without the need for performing phase tracking.

Example Implementation Using Differential Multi-Level Phase-Shift Keying

In one example, the mufti-modulation receiver is arranged to receive the LRLP subcarrier signals using Differential Multi-level Phase-Shift Keying, DMPSK. M is preferably a power of two, i.e., M=4, 8, . . . , although in principle also other values of M is possible. DMPSK is a means to increase the data rate compared to the binary case, i.e., M=2.

Example Implementation Using Data Rate Dependent Modulation

As noted in the example using Binary Phase-Shift Keying above, to obtain really good performance at low data rate, coherent reception is advantageous. However, when the SNR is moderate or even large the gain by coherent reception is less. According to some aspects, the modulation used is therefore made data rate dependent. Specifically, when the data rate of information received by the multi-modulation receiver is relatively high, a modulation which allows for low complex non-coherent reception is used, whereas when the received data rate is relatively low, a modulation which assumed coherent reception is employed.

Example Implementation Using Binary FSK with a Pilot Tone

Gaussian Frequency-Shift keying, GFSK, with integer modulation index (e.g. h=1) is beneficial for simple GFSK receivers because an integer modulation index induces spectral lines which are easily detectable. For example, a modulation index h=1 generates a data independent tone with a period equal to twice the symbol time. The multi-modulation receiver can use this pure tone for frequency and phase tracking. The disclosure also relates to methods for carrying out the steps associated with the disclosed units. The steps are typically performed in the units described above, but distributed implementations are also foreseeable. The units may be functional units, e.g. implemented, at least in part, as software. The functional units can be logically separate units or implemented within a logical framework, wherein logically separate means that the functional units can be individually addressed via signalling. Since the steps are typically performed in the units described above, the methods have all the advantages associated with the units described above.

Figure 15:
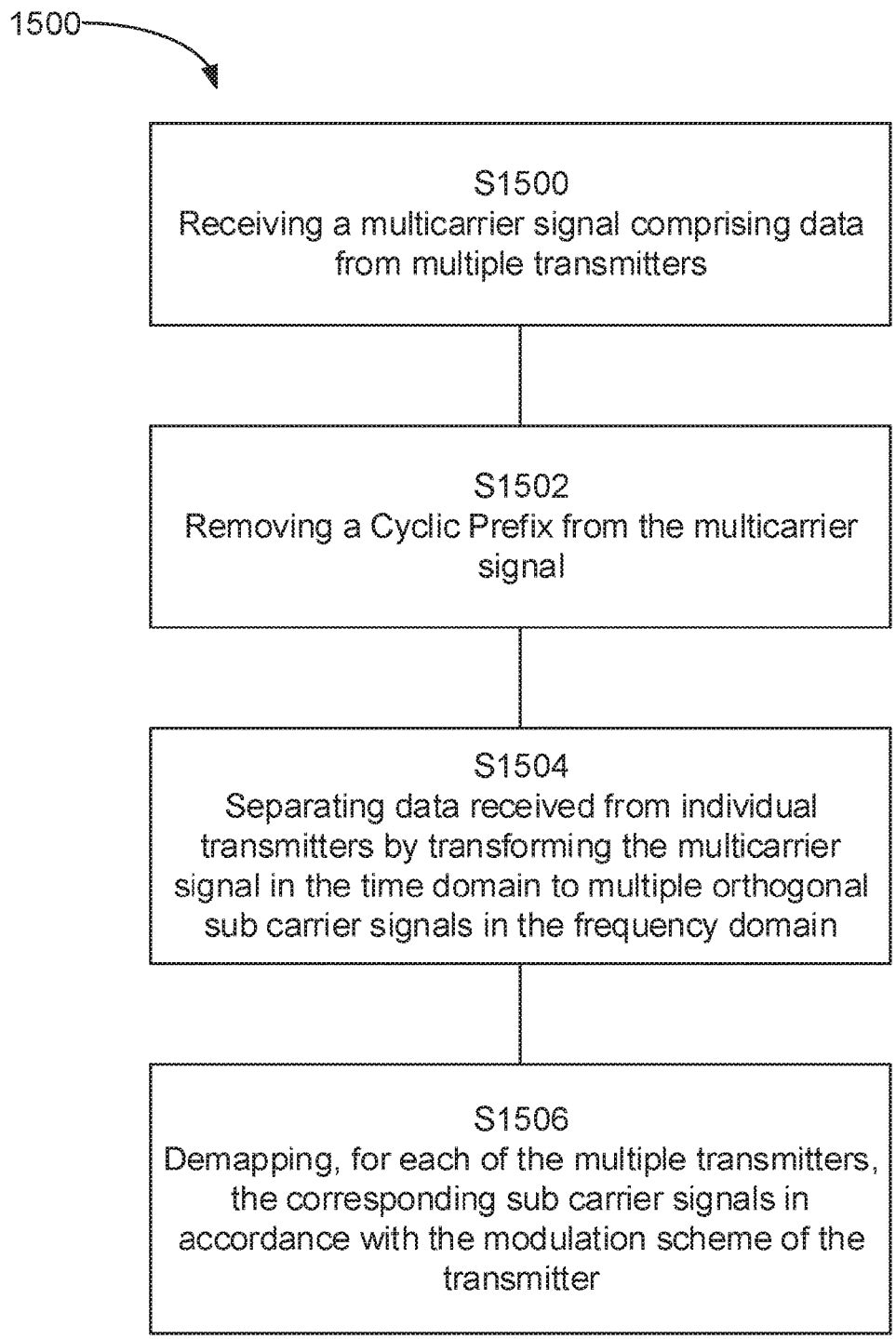
FIG. 15 is a flowchart that illustrates the method steps of receiving a multicarrier signal comprising data transmitted from multiple transmitters.

FIG. 15 is a flowchart that illustrates the method steps of a method 1500 for receiving a multicarrier signal comprising data transmitted from multiple transmitters, wherein at least one of the transmitters is an Orthogonal Frequency-Division Multiplexing, OFDM, transmitter and wherein at least one of the transmitters is a receiver using a modulation scheme other than OFDM and wherein data transmitted from different transmitters are mapped different subcarriers in the frequency domain. The method 1500 comprises receiving S1500 the multicarrier signal. The method 1500 further comprises removing S1502 a Cyclic Prefix, CP, from the multicarrier signal. The method also comprises separating S1504 data received from the individual transmitters by transforming the multicarrier signal in the time domain to multiple orthogonal subcarrier signals in the frequency domain. The method additionally comprises demapping S1506, for each of the multiple transmitters, the corresponding subcarrier signals in accordance with the modulation scheme of the transmitter. The proposed method supports concurrent reception, by a single receiver, of transmissions from different types of wireless devices, one able to transmit and receive high data rates, the other only able to transmit and receive considerably lower data rates.

According to some aspects, the different subcarriers are mutually orthogonal in the frequency domain.

Figure 16:
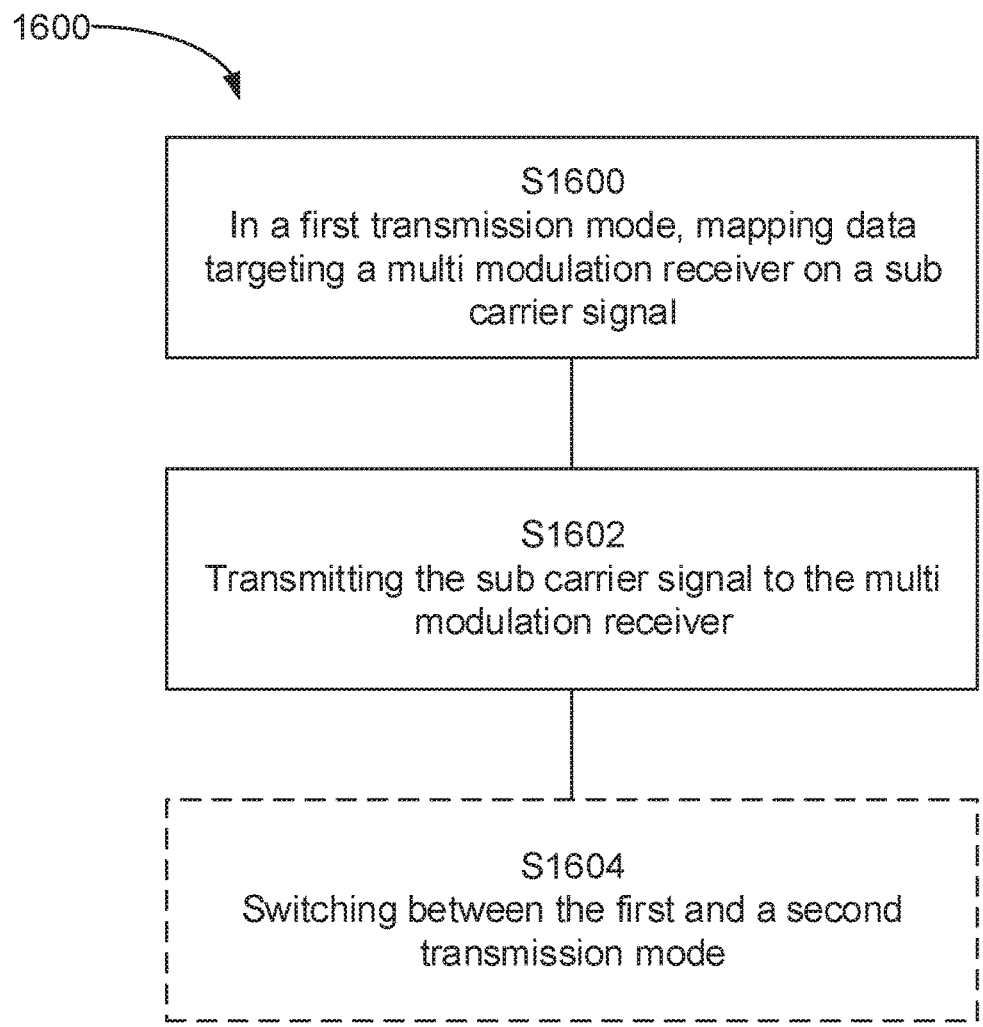
FIG. 16 is a flowchart that illustrates the method steps of transmitting data to a multi-modulation receiver.

The present disclosure also relates to a computer program comprising computer program code which, when executed, causes a multi-modulation receiver to execute the method 1500 for receiving a multicarrier signal comprising data transmitted from multiple transmitters. FIG. 16 is a flowchart that illustrates the method steps of a method 1600 for transmitting data to a multi-modulation receiver, wherein the multi-modulation receiver is configured to receive an OFDM signal. The method 1600 comprises, in a first transmission mode, mapping S1600 data targeting the multi-modulation receiver on a signal, using a repetition code matching an OFDM symbol duration of the multi-modulation receiver. In other words, the repetition code matches the OFDM symbol length of an OFDM signal that the multi-modulation receiver is configured to receive. The method 1600 further comprises transmitting S1602 the subcarrier signal to the multi-modulation receiver. The proposed method supports a single transmitter to communicate with a multi-modulation receiver according to the present disclosure.

According to some aspects, the method 1600 comprises switching S1604 between the first and a second transmission mode, wherein the second transmission mode uses another repetition code. Hence, the transmitter may also be compatible with a legacy receiver using a single carrier modulation scheme supported by the transmitter.

The present disclosure also relates to a computer program comprising computer program code which, when executed, causes a wireless device 914 comprising a non-OFDM transmitter according to the present disclosure to execute the method 1600 for transmitting data to a multi-modulation receiver.

Aspects of the disclosure are described with reference to the drawings, e.g., block diagrams and/or flowcharts. It is understood that several entities in the drawings, e.g., blocks of the block diagrams, and also combinations of entities in the drawings, can be implemented by computer program instructions, which instructions can be stored in a computer-readable memory, and also loaded onto a computer or other programmable data processing apparatus. Such computer program instructions can be provided to a processor of a general purpose computer, a special purpose computer and/or other programmable data processing apparatus to produce a machine, such that the instructions, which execute via the processor of the computer and/or other programmable data processing apparatus, create means for implementing the function acts specified in the block diagrams and/or flowchart block or blocks.

In some implementations and according to some aspects of the disclosure, the functions or steps noted in the blocks can occur out of the order noted in the operational illustrations. For example, two blocks shown in succession can in fact be executed substantially concurrently or the blocks can sometimes be executed in the reverse order, depending upon the functionality/acts involved. Also, the functions or steps noted in the blocks can according to some aspects of the disclosure be executed continuously in a loop.

In the drawings and specification, there have been disclosed exemplary aspects of the disclosure. However, many variations and modifications can be made to these aspects without substantially departing from the principles of the present disclosure. Thus, the disclosure should be regarded as illustrative rather than restrictive, and not as being limited to the particular aspects discussed above. Accordingly, although specific terms are employed, they are used in a generic and descriptive sense only and not for purposes of limitation.

The description of the example embodiments provided herein have been presented for purposes of illustration. The description is not intended to be exhaustive or to limit example embodiments to the precise form disclosed, and modifications and variations are possible in light of the above teachings or may be acquired from practice of various alternatives to the provided embodiments. The examples discussed herein were chosen and described in order to explain the principles and the nature of various example embodiments and its practical application to enable one skilled in the art to utilize the example embodiments in various manners and with various modifications as are suited to the particular use contemplated. The features of the embodiments described herein may be combined in all possible combinations of methods, apparatus, modules, systems, and computer program products. It should be appreciated that the example embodiments presented herein may be practiced in any combination with each other.

It should be noted that the word "comprising" does not necessarily exclude the presence of other elements or steps than those listed and the words "a" or "an" preceding an element do not exclude the presence of a plurality of such elements. It should further be noted that any reference signs do not limit the scope of the claims, that the example embodiments may be implemented at least in part by means of both hardware and software, and that several "means", "units" or "devices" may be represented by the same item of hardware.

Some of the various example embodiments described herein are described in the general context of functional units, method steps or processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that performs particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

The invention claimed is:

1. A multi-modulation receiver configured to receive a multicarrier signal comprising data transmitted from multiple transmitters, at least one of the transmitters is a transmitter using a modulation scheme other than Orthogonal Frequency-Division Multiplexing, OFDM, and data transmitted from different transmitters are mapped to different subcarriers in a frequency domain, the multi-modulation receiver comprising:
 a radio unit configured to receive the multicarrier signal;
 a cyclic prefix unit configured to remove a Cyclic Prefix, CP, from the received multicarrier signal;
 a Fast Fourier Transform, FFT, unit configured to separate data received from the individual transmitters into mutually orthogonal subcarriers by transforming the multicarrier signal in a time domain to multiple orthogonal subcarrier signals in the frequency domain; and
 a demapping unit configured to, for each of the multiple transmitters, demap the corresponding subcarrier signals in accordance with the modulation scheme of the respective transmitter.

2. The multi-modulation receiver according to claim 1, wherein at least one of the multiple transmitters is an OFDM transmitter.

3. The multi-modulation receiver according to claim 2, wherein the transmitter using a modulation scheme other than OFDM has a lower data rate than the OFDM transmitter.

4. The multi-modulation receiver according to claim 2, wherein the OFDM transmitter operates in accordance with one of IEEE 802.11 and 802.11ax.

5. The multi-modulation receiver according to claim 1, wherein the demapping unit is configured to demap the data such that data transmitted from different transmitters are mapped to in the frequency domain mutually orthogonal subcarriers.

6. The multi-modulation receiver according to claim 1, wherein the transmitter using a modulation scheme other than OFDM is a single carrier transmitter.

7. The multi-modulation receiver according to claim 1, wherein the transmitter using a modulation scheme other than OFDM is a Frequency-Shift Keying, FSK, transmitter.

8. The multi-modulation receiver according to claim 1, wherein the demapping unit is configured to demap the data such that the demapping is performed based on output amplitudes after the transformation to the frequency domain.

9. A network node in a wireless communication network comprising a multi-modulation receiver, the multi-modulation receiver being configured to receive a multicarrier signal comprising data transmitted from multiple transmitters, at least one of the transmitters is a transmitter using a modulation scheme other than Orthogonal Frequency-Division Multiplexing, OFDM, and data transmitted from different transmitters are mapped to different subcarriers in a frequency domain, the multi-modulation receiver comprising:
 a radio unit configured to receive the multicarrier signal;
 a cyclic prefix unit configured to remove a Cyclic Prefix, CP, from the received multicarrier signal;
 a Fast Fourier Transform, FFT, unit configured to separate data received from the individual transmitters into mutually orthogonal subcarriers by transforming the multicarrier signal in a time domain to multiple orthogonal subcarrier signals in the frequency domain; and
 a demapping unit configured to, for each of the multiple transmitters, demap the corresponding subcarrier signals in accordance with the modulation scheme of the respective transmitter.

10. A non-OFDM transmitter for transmitting data to a multi-modulation receiver, the mufti-modulation receiver being configured to receive an OFDM signal, the non-OFDM transmitter comprising:
 a mapping unit configured to, in a first transmission mode, map data targeting the multi-modulation receiver on a subcarrier signal, using a repetition code matching an OFDM symbol duration of the multi-modulation receiver, the repetition code corresponding to a repetition of a symbol in the non-OFDM transmitter; and
 a radio unit configured to transmit the subcarrier signal to the multi-modulation receiver.

11. The non-OFDM transmitter according to claim 10, wherein the mapping unit is configured to, in a second transmission mode, use another repetition code.

12. The non-OFDM transmitter according to claim 11, wherein the mapping unit is configured to switch between the first and second transmission modes.

13. The non-OFDM transmitter according to claim 11, wherein the first and second transmission modes use different modulation schemes.

14. The non-OFDM transmitter according to claim 10, wherein the repetition code is such that an accumulated duration of repetitions of one symbol in the non-OFDM transmitter equals a duration of an input to a Fast Fourier Transform, FFT, plus a duration of a cyclic prefix, CP, of one OFDM symbol.

15. The non-OFDM transmitter according to claim 10, wherein the non-OFDM transmitted is included as a part of a wireless device.

16. A method for receiving a multicarrier signal comprising data transmitted from multiple transmitters, at least one of the transmitters is an Orthogonal Frequency-Division Multiplexing, OFDM, transmitter, at least one of the transmitters is a transmitter using a modulation scheme other than OFDM, and data transmitted from different transmitters are mapped different subcarriers in a frequency domain, the method comprising:
 receiving the multicarrier signal;
 removing a Cyclic Prefix, CP, from the multicarrier signal;
 separating data received from the individual transmitters by transforming the multicarrier signal in a time domain to multiple orthogonal subcarrier signals in the frequency domain; and
 demapping, for each of the multiple transmitters, the corresponding subcarrier signals in accordance with the modulation scheme of the transmitter.

17. The method according to claim 16, wherein the different subcarriers are mutually orthogonal in the frequency domain.

18. A non-transitory computer storage media storing computer program code which, when executed by a processor on a multi-modulation receiver, causes the multi-modulation receiver to perform a method for receiving a multicarrier signal comprising data transmitted from multiple transmitters, at least one of the transmitters is an Orthogonal Frequency-Division Multiplexing, OFDM, transmitter, at least one of the transmitters is a transmitter using a modulation scheme other than OFDM, and data transmitted from different transmitters are mapped different subcarriers in a frequency domain, the method comprising:
 receiving the multicarrier signal;
 removing a Cyclic Prefix, CP, from the multicarrier signal;
 separating data received from the individual transmitters by transforming the multicarrier signal in a time domain to multiple orthogonal subcarrier signals in the frequency domain; and demapping, for each of the multiple transmitters, the corresponding subcarrier signals in accordance with the modulation scheme of the transmitter.

19. A method for transmitting data to a multi-modulation receiver, the multi-modulation receiver being configured to receive an OFDM signal, the method comprising:
   in a first transmission mode, mapping data targeting the multi-modulation receiver on a signal, using a repetition code matching an OFDM symbol duration of the multi-modulation receiver, the repetition code corresponding to a repetition of a symbol in the non-OFDM transmitter; and
   transmitting a subcarrier signal to the multi-modulation receiver.

20. The method according to claim 19, the method further comprising:
   switching between the first and a second transmission mode, wherein the second transmission mode uses another repetition code.

21. A non-transitory computer storage media storing computer program code which, when executed by a processor on a wireless device, the wireless comprising a non-OFDM transmitter for transmitting data to a multi-modulation receiver, the multi-modulation receiver being configured to receive an OFDM signal,
   causes the wireless device to perform a method, the method comprising:
   in a first transmission mode, mapping data targeting the multi-modulation receiver on a signal, using a repetition code matching an OFDM symbol duration of the multi-modulation receiver, the repetition code corresponding to a repetition of a symbol in the non-OFDM transmitter; and
   transmitting the subcarrier signal to the multi-modulation receiver.

* * * * *